(12) United States Patent
Fujimoto et al.

(10) Patent No.: US 12,659,245 B2
(45) Date of Patent: Jun. 16, 2026

(54) SERVER DELAY CONTROL DEVICE, SERVER DELAY CONTROL METHOD AND PROGRAM

(71) Applicant: NTT, Inc., Tokyo (JP)

(72) Inventors: Kei Fujimoto, Musashino (JP); Ko Natori, Musashino (JP)

(73) Assignee: NTT, Inc., Tokyo (JP)

( * ) Notice: Subject to any disclaimer, the term of this patent is extended or adjusted under 35 U.S.C. 154(b) by 67 days.

(21) Appl. No.: 18/856,664

(22) PCT Filed: Apr. 15, 2022

(86) PCT No.: PCT/JP2022/017943
§ 371 (c)(1),
(2) Date: Oct. 14, 2024

(87) PCT Pub. No.: WO2023/199519
PCT Pub. Date: Oct. 19, 2023

(65) Prior Publication Data
US 2025/0233808 A1 Jul. 17, 2025

(51) Int. Cl.
*H04L 43/02* (2022.01)
*G06F 9/48* (2006.01)
*G06F 9/54* (2006.01)

(52) U.S. Cl.
CPC ............ *H04L 43/02* (2013.01); *G06F 9/4812* (2013.01); *G06F 9/545* (2013.01)

(58) Field of Classification Search
CPC ......... H04L 43/02; H04L 69/28; H04L 47/10; G06F 9/4812; G06F 9/545
See application file for complete search history.

(56) References Cited

U.S. PATENT DOCUMENTS

| | | | | |
|---|---|---|---|---|
| 9,378,047 B1* | 6/2016 | Gould | ..................... | G06F 9/542 |
| 10,560,373 B2* | 2/2020 | St-Laurent | .............. | H04L 47/34 |
| 11,824,962 B2* | 11/2023 | Masputra | .............. | G06F 9/4411 |

(Continued)

FOREIGN PATENT DOCUMENTS

| | | | | |
|---|---|---|---|---|
| AU | 2014311461 B2 * | 2/2017 | .......... | G06F 9/5088 |
| JP | 2004127083 A * | 4/2004 | | |

(Continued)

OTHER PUBLICATIONS

LWN.net [online], "Introduction to NAPI," Jan. 2002, retrieved on Oct. 2024, retrieved from URL<https://lwn.net/2002/0321/a/napi-howto.php3>, 37 pages.

(Continued)

*Primary Examiner* — Khanh Q Dinh
(74) *Attorney, Agent, or Firm* — Fish & Richardson P.C.

(57) ABSTRACT

A server delay controller includes: a packet harvesting unit that refers to a packet held in a ring buffer when a packet arrives and executes harvesting to delete an entry of a corresponding queue from the ring buffer, a sleep management unit that puts the thread to sleep in a case in which a packet does not arrive for a predetermined period, and cancels the sleep of the thread through a hardware interrupt at the time of packet arrival, and an idle state recovery control unit that periodically wakes up the thread during sleep or wakes up the thread immediately before the packet arrival in accordance with a packet arrival timing.

8 Claims, 25 Drawing Sheets

(56)     References Cited

U.S. PATENT DOCUMENTS

| | | | |
|---|---|---|---|
| 2013/0024875 A1* | 1/2013 | Wang | G06F 9/542 |
| | | | 719/318 |
| 2015/0149666 A1* | 5/2015 | Wang | G06F 13/22 |
| | | | 710/46 |
| 2015/0347169 A1* | 12/2015 | Tsirkin | G06F 9/45545 |
| | | | 718/1 |
| 2018/0032454 A1* | 2/2018 | Wang | G06F 9/542 |
| 2018/0295052 A1* | 10/2018 | St-Laurent | H04L 69/321 |
| 2018/0336148 A1* | 11/2018 | Wang | G06F 9/542 |
| 2019/0079883 A1* | 3/2019 | Wang | G06F 9/542 |
| 2020/0334183 A1* | 10/2020 | Wang | G06F 9/542 |
| 2022/0075654 A1 | 3/2022 | Koukos et al. | |
| 2023/0029932 A1 | 2/2023 | Fujimoto | |
| 2024/0126593 A1* | 4/2024 | Wu | G06F 21/74 |

FOREIGN PATENT DOCUMENTS

| | | | | |
|---|---|---|---|---|
| JP | 2009-260925 | 11/2009 | | |
| JP | 2018-507457 | 3/2018 | | |
| KR | 20170042217 A * | 4/2017 | | G06F 3/0655 |
| WO | WO 2016101099 | 6/2016 | | |
| WO | WO 2021130828 | 7/2021 | | |

OTHER PUBLICATIONS

Sharetechnote.com [online], "5G Frame Structure," available on or before Sep. 2018, retrieved on Oct. 2024, retrieved from URL<https://www.sharetechnote.com/html/5G/5G_FrameStructure.html>, 18 pages.

Extended European Search Report in European Appln No. 22937496.2, mailed on Jan. 12, 2026, 9 pages.

* cited by examiner

Fig. 5

| NAME | STATE | OPERATION STATE |
|------|-------|-----------------|
| C0 | Full Operation | CPU IS FULLY ON |
| C1 | Halt | MAIN BUILT-IN CLOCK OF CPU IS STOPPED BY SOFTWARE. BUS INTERFACE UNIT AND APIC CONTINUE OPERATION AT MAXIMUM RATE |
| C2 | Stop clock | BUILT-IN CLOCK OF CPU AND EXTERNAL CLOCK ARE STOPPED BY HARDWARE |
| C3 | Deep sleep | BUILT-IN CLOCK OF CPU AND EXTERNAL CLOCK OF ALL CPUS ARE STOPPED |
| C4 | Deeper sleep | CPU VOLTAGE IS LOWERED |
| C5 | Enhanced deeper sleep | CPU VOLTAGE IS FURTHER LOWERED AND MEMORY CASHE IS TURNED OFF |
| C6 | Deep power down | INTERNAL VOLTAGE OF CPU IS LOWERED TO ANY VALUE INCLUDING 0 VOLTS |

Fig. 15

| Numerology | SUBCARRIER INTERVAL | 1symbol TIME |
|---|---|---|
| 0 | 15kHz | 71. 4 usec |
| 1 | 30kHz | 35. 7 usec |
| 2 | 60kHz | 17. 9 usec |
| 3 | 120kHz | 8. 93 usec |
| 4 | 240kHz | 4. 46 usec |

SERVER DELAY CONTROL DEVICE, SERVER DELAY CONTROL METHOD AND PROGRAM

CROSS-REFERENCE TO RELATED APPLICATIONS

This application is a National Stage application under 35 U.S.C. § 371 of International Application No. PCT/JP2022/017943, having an International Filing Date of Apr. 15, 2022.

The disclosure of the prior application is considered part of the disclosure of this application, and is incorporated by reference in its entirety into this application.

TECHNICAL FIELD

The present invention relates to a server delay controller, a server delay control method, and a program.

BACKGROUND ART

A system is constructed and operated for each service under a background of a virtualization technology being on progress through network function virtualization (NFV). Further, instead of the above mode in which a system is constructed for each service, a mode called service function chaining (SFC) is now becoming a mainstream. The SFC is a mode in which a service function is divided into units of reusable modules, and each of the divided modules is caused to operate in an independent virtual machine (for example, virtual machine (VM) or container) environment and thereby used like a component as necessary, thereby improving operability.

As a technology for constructing a virtual machine, a hypervisor environment that includes Linux (registered trademark) and a kernel-based virtual machine (KVM) is well known. In this environment, a host OS (an OS installed in a physical server is called a host OS) into which a KVM module is incorporated operates as a hypervisor in a memory area called a kernel space different from a user space. In this environment, a virtual machine operates in the user space, and a guest OS (an OS installed in a virtual machine is called a guest OS) operates in the virtual machine.

Unlike the physical server in which the host OS operates, the virtual machine in which the guest OS operates is designed so that all the hardware (HW) including the network device (typically an Ethernet card device or the like) is controlled thorough register control necessary for interrupt processing from the HW to the guest OS and writing from the guest OS into the hardware. In such register control, notifications and processing that should be originally executed by physical hardware are emulated by software, and therefore, performance is generally lower than that in the host OS environment.

To address this performance degradation, there is a technology for reducing HW emulation by a guest OS of a host OS or an external process existing outside a virtual machine itself and thereby enhancing communication performance and versatility with a high-speed and unified interface. As this technology, a device abstraction technology called virtio, is which a quasi-virtualization technology, has been developed and already incorporated into many general-purpose OSs such as Linux and FreeBSD (registered trademark), and is currently being used.

In virtio, data exchange through a queue designed with a ring buffer is defined by a queue operation as a transfer transport of transfer data in a single direction, for data input/output such as consoles, file input/output, and network communication. Then, communication between the guest OS and the outside of a virtual machine itself can be achieved simply through an operation using a queue without executing hardware emulation, by preparing the number and the size of queues suitable for each device at the time of activation of the guest OS by using the specifications of the virtio queue.

Packet Transfer by Polling Model (Example of DPDK)

A method for connecting and associating a plurality of virtual machines is called inter-VM communication, and, a large-scale environment such as a data center has normally used virtual switches for connection between VMs. However, because communication delay is large in this method, higher-speed methods have been newly proposed. Examples of the proposed methods include a method using special hardware called single root I/O virtualization (SR-IOV), a method implemented by software using the Intel data plane development kit (hereinafter referred to as DPDK) that is a high-speed packet processing library, and the like.

A DPDK is a framework for performing network interface card (NIC) control, which has conventionally been performed by a Linux kernel (registered trademark), in a user space. The largest difference from the processing by the Linux kernel lies in that the DPDK has a polling-based reception mechanism called a pull mode driver (PMD). Normally, in Linux kernel, an interrupt occurs when data arrives at a NIC, which interrupt causes an execution of reception processing. On the other hand, in the PMD, a dedicated thread continuously performs data arrival confirmation and reception processing. This eliminates overheads such as context switches and interrupts to perform high-speed packet processing. The DPDK greatly improves performance and throughput of the packet processing so as to allow securing more time for data plane application processing.

The DPDK exclusively uses computer resources such as a central processing unit (CPU) and a NIC. For this reason, it is difficult to use the DPDK for a purpose of flexible switching in units of modules like SFC. This difficulty is able to be alleviated by an application called a soft patch panel (SPP). The SPP prepares a shared memory space between VMs, and configures the same memory being able to be directly referred to, so as to omit packet copying in a virtualization layer. In addition, exchange of packets between a physical NIC and the shared memory uses the DPDK to achieve higher speed. The SPP can change an input source and an output destination of packets in a software-like manner by controlling the reference destination of memory exchange by each VM. Through this processing, the SPP achieves dynamic of connection switching between VMs and between a VM and a physical NIC.

Rx-Side Packet Processing by New API (NAPI)

FIG. 22 is a schematic diagram of Rx-side packet processing by a New API (NAPI) implemented in Linux kernel 2.5/2.6 or later (see Non Patent Literature 1).

As illustrated in FIG. 22, the New API (NAPI) executes a packet processing APL 1 arranged in a user space 60 that can be used by a user on a server including an OS 70 (a host OS, for example), and performs packet transfer between a NIC 11 of HW 10 connected to the OS 70 and the packet processing APL 1.

The OS 70 includes a kernel 71, a ring buffer 72, and a driver 73, and the kernel 71 includes a protocol processing unit 74.

The kernel 71 is responsible for a function of a core portion of the OS 70 (a host OS, for example), and manages monitoring of hardware and an execution state of a program in units of processes. Here, the kernel 71 responds to a request from the packet processing APL 1, and transmits a request from the HW 10 to the packet processing APL 1 The kernel 71 processes the request from the packet processing APL 1 via a system call (means through which "a user program operating in unprivileged mode" requests "a kernel operating in privileged mode" to perform processing).

The kernel 71 transmits a packet to the packet processing APL 1 via a socket 75. The kernel 71 receives a packet from the packet processing APL 1 via the socket 75.

The ring buffer 72 is managed by the kernel 71, and is in a memory space in the server. The ring buffer 72 is a buffer of a certain size that stores messages output by the kernel 71 as a log, and is overwritten starting from the head when an amount of messages exceeds an upper limit size of the buffer.

The driver 73 is a device driver for monitoring hardware under the kernel 71. Note that the driver 73 depends on the kernel 71 and turns into a different driver when a created (built) kernel source changes. In this case, the driver source should be obtained and the driver should be rebuilt on the OS that is to use the driver, and thus, the driver should be created.

The protocol processing unit 74 performs protocol processing of L2 (data link layer)/L3 (network layer)/L4 (transport layer), which is defined by the Open Systems Interconnection (OSI) reference model.

The socket 75 is an interface for the kernel 71 to perform interprocess communication. The socket 75 has a socket buffer so as to suppress frequent data copy processing. A flow for communication establishment via the socket 75 is as follows: 1) the server creates a socket file for accepting clients; 2) the socket file for accepting clients is given a name; 3) a socket queue is created; 4) the first one of connections from the clients queued in the socket queue is accepted; 5) the client creates a socket file; 6) the client issues a connection request to the server; 7) the server creates a connection socket file separately from the socket file for accepting clients The communication establishment allows the packet processing APL 1 to call up a system call such as read () or write () from the kernel 71.

In the above configuration, the kernel 71 receives a packet arrival notification from the NIC 11 through a hardware interrupt (hardIRQ), and schedules a software interrupt (softIRQ) for packet processing.

When a packet arrives, the above New API (NAPI) implemented in Linux kernel 2.5/2.6 or later performs packet processing through the software interrupt (softIRQ) after the hardware interrupt (hardIRQ). As illustrated in FIG. 22, in the packet transfer using an interrupt model, a packet is transferred through interrupt processing (see reference sign "a" in FIG. 22). Therefore, queueing for the interrupt processing is generated, which increases a packet transfer delay.

An outline of NAPI Rx-side packet processing is described below.

Configuration of Rx-side packet processing by New API (NAPI)

FIG. 23 is a diagram describing an outline of the Rx-side packet processing by the New API (NAPI) in a portion surrounded by a broken line in FIG. 22.

Device Driver

As illustrated in FIG. 23, there are arranged in the "device driver", the NIC 11 (physical NIC) is a network interface card, hardIRQ 81 serving as a handler that is called in response to issuance of a processing request from the NIC 11 and executes the requested processing (hardware interrupt), and netif_rx 82 serving as a software interrupt processing functional unit.

Networking Layer

In a networking layer, there are arranged softIRQ 83 serving as a handler that is called in response to issuance of a processing request from the netif_rx 82 and executes the requested processing (software interrupt), and do_softirq 84 serving as a control functional unit that executes the software interrupt (softIRQ). In addition, there are arranged net_rx_action 85, which is a packet processing functional unit that receives and executes a software interrupt (softIRQ), poll_list 86, which registers information about a net device (net_device) indicating which device the hardware interrupt from the NIC 11 comes from, netif_receive_skb 87, which creates an sk_buff structure (a structure for making the kernel 71 obtain a state of a packet), and the ring buffer 72.

Protocol Layer

In a protocol layer, ip_rcv 88, arp_rcv 89, and the like, which are packet processing functional units, are arranged.

The above netif_rx 82, do_softirq 84, net_rx_action 85, netif_receive_skb 87, ip_rcv 88, and arp_rcv 89 are program components (names of functions) to be used for packet processing in the kernel 71.

Operation of Rx-Side Packet Processing by New API (NAPI)

Arrows (reference signs) "b" to "m" in FIG. 23 indicate a flow of the Rx-side packet processing.

When receiving a packet (or a frame) in a frame from a counterpart device, a hardware functional unit 11*a* of the NIC 11 (hereinafter, referred to as the NIC 11) copies a packet that has arrived at to the ring buffer 72 by direct memory access (DMA) transfer (see reference sign "b" in FIG. 23), without using the CPU. The ring buffer 72 is the memory space in the server and managed by the kernel 71 (see FIG. 22).

However, the kernel 71 cannot recognize the packet just because the NIC 11 copies the packet that has arrived at the ring buffer 72. Therefore, when the packet arrives, the NIC 11 puts a hardware interrupt (hardIRQ) into the hardIRQ 81 (see reference sign "c" in FIG. 23), so that the netif_rx 82 executes the processing described below and causes the kernel 71 to recognize the packet. Note that the hardIRQ 81 surrounded by an ellipse in FIG. 23 represents a handler, not a functional unit.

The netif_rx 82 has a function of actually performing processing, and, when the hardIRQ 81 (handler) starts up (see reference sign "d" in FIG. 23), the netif_rx 82 stores in the poll_list 86 information regarding the net device (net_device) indicating which device the hardware interrupt from the NIC 11 comes from, which is one piece of information contained in content of the hardware interrupt (hardIRQ). Then, the netif_rx 82 register harvesting of queues, which is to refer to the content of packets accumulated in a buffer and to delete from the buffer entries of corresponding queues for the processing of the packets in consideration of next processing) (see reference sign "e" in FIG. 23). Specifically, when packets are packed into the ring buffer 72, the netif_rx 82 registers harvesting of subsequent queues in the poll_list 86 by using a driver of the NIC 11. Thus, queue harvesting information caused by the packets packed into the ring buffer 72 is registered in the poll_list 86.

As described above, in "Device driver in FIG. 23, when receiving a packet, the NIC 11 copies the packet that has arrived into the ring buffer 72 by DMA transfer. In addition, the NIC 11 starts the hardIRQ 81 (handler), and the netif_rx 82 registers the net_device in the poll_list 86 and schedules a software interrupt (softIRQ).

By this point, the hardware interrupt processing in "Device driver" in FIG. 23 stops.

Thereafter, the netif_rx 82 raises harvesting of data stored in the ring buffer 72, which is executed by using information (specifically, pointers) in the queues accumulated in the poll_list 86, to the softIRQ 83 (handler) through a software interrupt (softIRQ) (see reference sign "f" in FIG. 23) and notifies the do_softirq 84 serving as the software interrupt control functional unit of the harvesting of the data (see reference sign "g" in FIG. 23).

The do_softirq 84 is a software interrupt control functional unit, and defines functions of a software interrupt (there are various kinds of packet processing, and the interrupt processing is one of them; here is defined interrupt processing). Based on the definition, the do_softirq 84 notifies the net_rx_action 85 that actually performs software interrupt processing of a request for a current (corresponding) software interrupt (see reference sign "h" in FIG. 23).

When a turn of the softIRQ comes around, the net_rx_action 85 calls a polling routine for harvesting packets from the ring buffer 72 on the basis of the net_device registered in the poll_list 86 (see reference sign "" in FIG. 23) and harvests the packets (see reference sign "j" in FIG. 23). At this time, the net_rx_action 85 continues the harvesting until the poll_list 86 becomes empty.

Thereafter, the net_rx_action 85 transmits a notification to the netif_receive_skb 87 (see reference sign "k" in FIG. 23).

The netif_receive_skb 87 creates a sk_buff structure, analyzes the content of the packets, and passes processing to the protocol processing unit 74 in the later stage (see FIG. 22) for each type. Specifically, the netif_receive_skb 87 analyzes the content of the packets. In a case in which processing is performed in accordance with the content of the packets, the processing is passed to the ip_rcv 88 of "Protocol Layer" (reference sign "l" in FIG. 23). In a case of L2, for example, the processing is passed to the arp_rcv 89 (reference sign "m" in FIG. 23).

Patent Literature 1 describes a server network delay controller, (KBP: kernel busy poll). The KBP constantly monitors packet arrival in a polling model in the kernel. Thus, softIRQ is reduced, and low-delay packet processing is achieved.

CITATION LIST

Patent Literature

Patent Literature 1: WO 2021/130828 A

Non Patent Literature

Non Patent Literature 1: New API (NAPI), [online], [searched on Apr. 4, 2022], the Internet <URL: http://lwn.net/2002/0321/a/napi-howto.php3>
Non Patent Literature 2: <URL: 5G FrameStructure, [online], https://www.sharetechnote.com/html/5G/5G Frame-Structure.html>

SUMMARY OF INVENTION

Technical Problem

However, packet transfer using an interrupt model or a polling model has the problems described below.

The interrupt model performs packet transfer through software interrupt processing for the kernel that has received an event (hardware interrupt) from HW to perform packet processing. Therefore, the interrupt model performs packet transfer through interrupt (software interrupt) processing, and thus conflict with another interrupt is generated, or queueing is generated when an interrupt destination CPU is used for a process having higher priority, which results in a longer delay in packet transfer. In this case, when interrupt processing is congested, a queueing delay becomes further longer.

For example, in packet transfer by an interrupt model, a packet is transferred through interrupt processing. Therefore, queueing for the interrupt processing occurs, which increases the packet transfer delay.

A mechanism in which a delay occurs in an interrupt model is described in further detail.

In a general kernel, packet transfer processing is transmitted through software interrupt processing after hardware interrupt processing.

When a software interrupt of packet transfer processing occurs, the software interrupt processing cannot be immediately executed under the conditions (1) to (3) described below. For this reason, the interrupt processing is scheduled through arbitration by a scheduler such as ksoftirgd (the kernel thread for each CPU, which is executed when load of the software interrupt is high), and therefore, ms-order queueing occurs.

Under the following conditions, the software interrupt processing cannot be immediately executed:

(1) a case of conflicting with other hardware interrupt processing;

(2) a case of conflicting with other software interrupt processing;

(3) a case of an interrupt destination CPU being used by another process having high priority or kernel thread (for example, migration thread).

In addition, as for packet processing by a New API (NAPI), a ms-order NW delay occurs due to interrupt processing (softIRQ) contention, as indicated by a dashed-line box "n" in FIG. 23.

On the other hand, when the technology described in Patent Literature 1 is used, by constantly monitoring packet arrival, it is possible to curb software interrupt and to achieve low-delay packet harvesting. However, because monitoring of packet arrival occupies a CPU core and uses a CPU time, power consumption increases. That is, because the kernel thread that constantly monitors a packet arrival occupies the CPU core and always uses the CPU time, there is a problem of an increase in power consumption. A relationship between workload and a CPU usage rate is described with reference to FIGS. 24 and 25.

FIG. 24 is an example of data transfer of video (30 FPS). The workload illustrated in FIG. 24 is to intermittently perform data transfer every 30 ms at a transfer rate of 350 Mbps.

FIG. 25 is a diagram illustrating the usage rate of the CPU that is used by a busy poll thread in the KBP described in Patent Literature 1.

As illustrated in FIG. 25, in the KBP, the kernel thread occupies the CPU core to perform the busy poll. Even in the intermittent packet reception illustrated in FIG. 24, the CPU is always used by the KBP, regardless of whether a packet arrives or not. Therefore, there is the problem of an increase in power consumption.

The present invention has been made in view of such a background, and an object of the present invention is to perform packet transfer with a shorter delay in the server while curbing excessive occurrences of HW interrupts due to sleep of a polling thread to reduce power consumption.

Solution to Problem

In order to achieve the object described above, a server delay controller that is arranged in a kernel space of an OS and starts a thread that monitors packet arrival using a polling model, the server delay controller includes: a packet arrival monitoring unit that monitors a poll list that registers net device information indicating which device a hardware interrupt from an interface unit comes from; a packet harvesting unit that refers to a packet held in a ring buffer when a packet arrives and executes harvesting to delete an entry of a corresponding queue from the ring buffer; a sleep management unit that causes the thread to sleep in a case where a packet does not arrive for a predetermined period, and cancels the sleep of the thread through a hardware interrupt at the time of packet arrival, and an idle state recovery control unit that periodically wakes up the thread during sleep or wakes up the thread immediately before the packet arrival in accordance with a packet arrival timing.

Advantageous Effects of Invention

The present invention allows performing packet transfer with a shorter delay in the server while curbing excessive occurrences of HW interrupts due to sleep of a polling thread to reduce power consumption.

Advantageous Effects of Invention

The present invention allows performing packet transfer with a shorter delay in the server while curbing excessive occurrences of HW interrupts due to sleep of a polling thread to reduce power consumption.

BRIEF DESCRIPTION OF DRAWINGS

FIG. 5 is a diagram illustrating a table of an example of states of C-state of the server delay control system according to the first embodiment of the present invention.

FIG. 15 is a diagram illustrating a table of subcarrier intervals and symbol intervals for each numerology of the server delay control system according to the second embodiment of the present invention.

FIG. 18 is a diagram illustrating an example in which a server delay control system in which a polling thread is arranged in a kernel is applied to an interrupt model in a server virtualized environment of a general-purpose Linux kernel (registered trademark) and a VM configuration.

Figure 19:
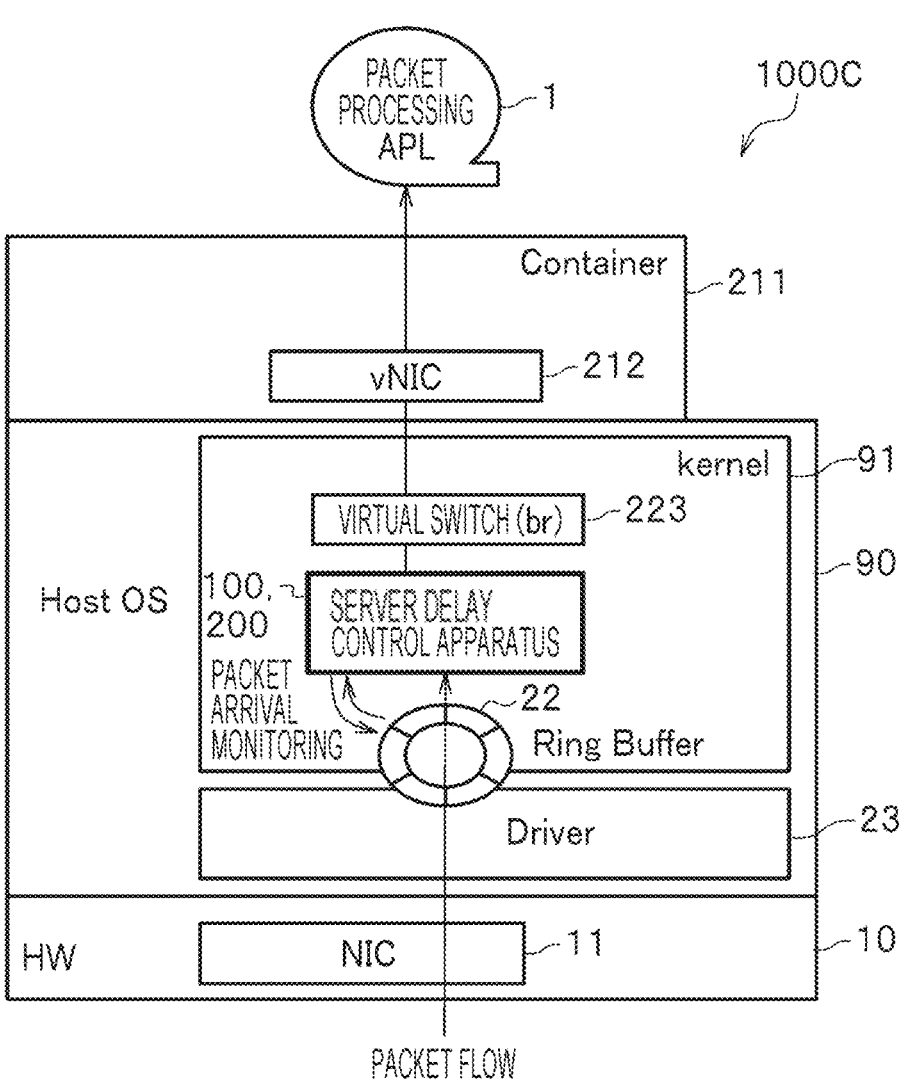

FIG. 19 is a diagram illustrating an example in which a server delay control system in which a polling thread is arranged in a kernel is applied to an interrupt model in a server virtualized environment having a container configuration.

Figure 20:
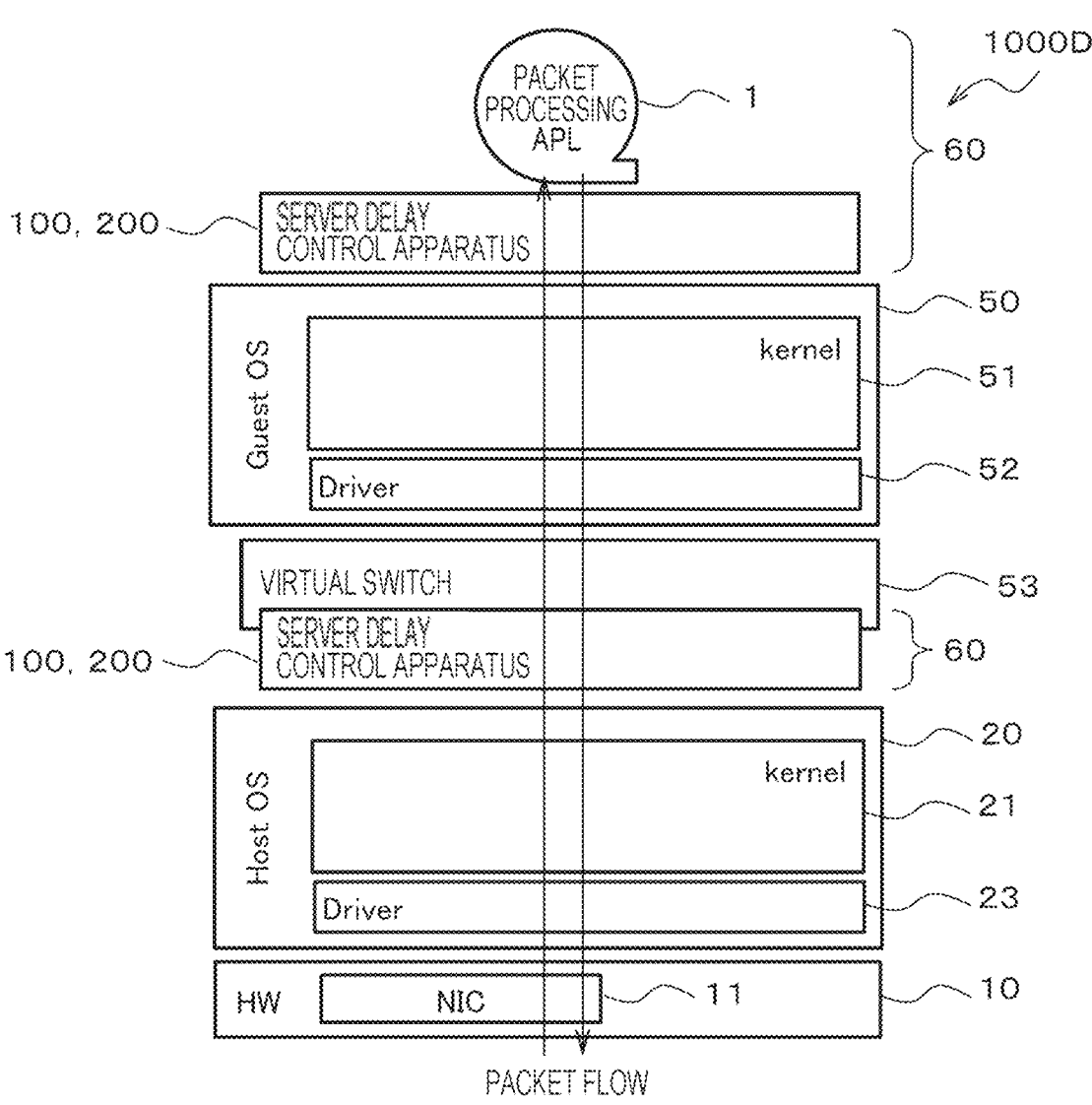

FIG. 20 is a diagram illustrating an example in which a server delay control system in which a polling thread is arranged in a user space is applied to an interrupt model in a server virtualized environment of a general-purpose Linux kernel (registered trademark) and a VM configuration.

Figure 21:
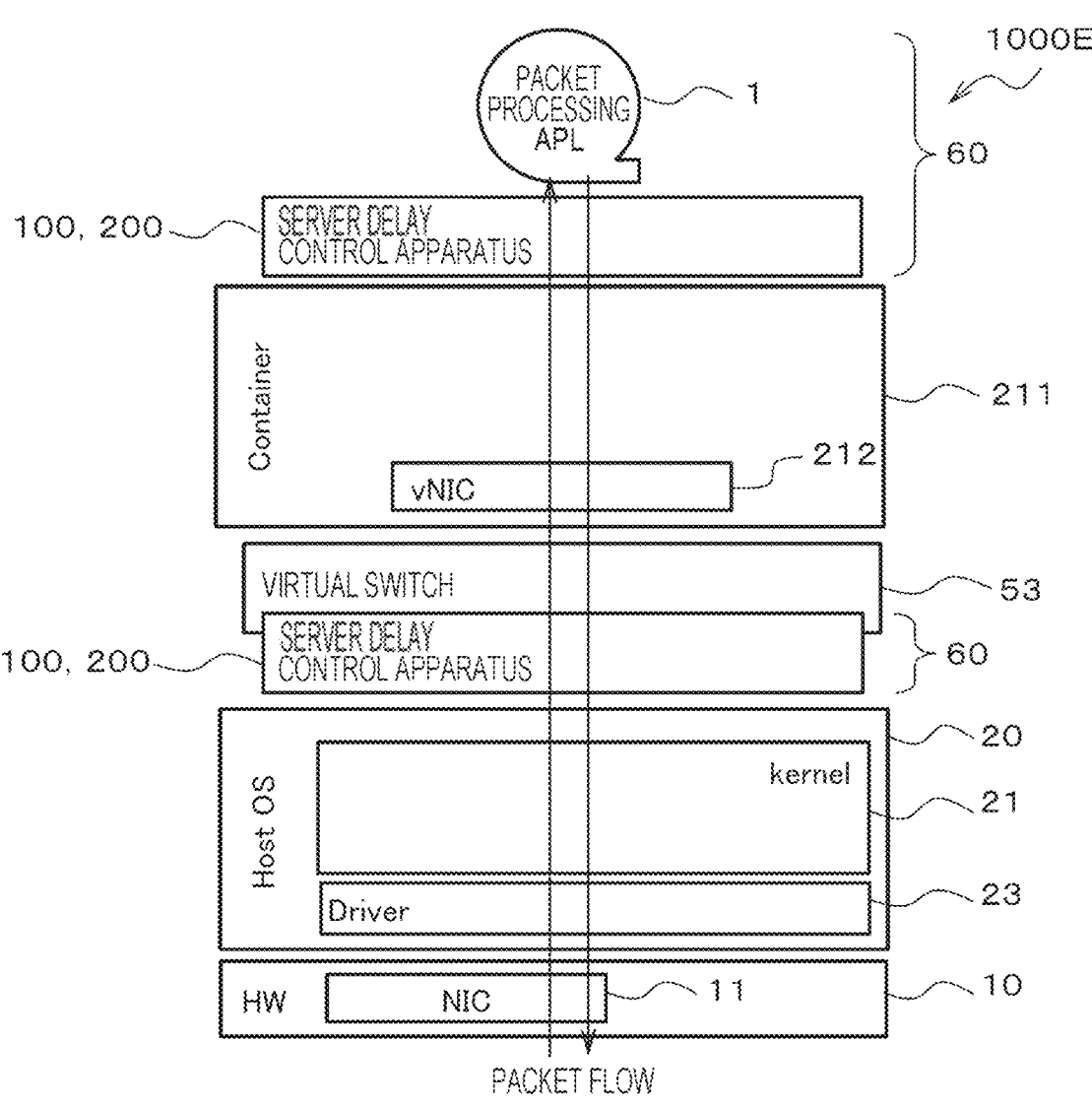

FIG. 21 is a diagram illustrating an example in which a server delay control system in which a polling thread is arranged in a user space is applied to an interrupt model in a server virtualized environment having a container configuration.

Figure 22:
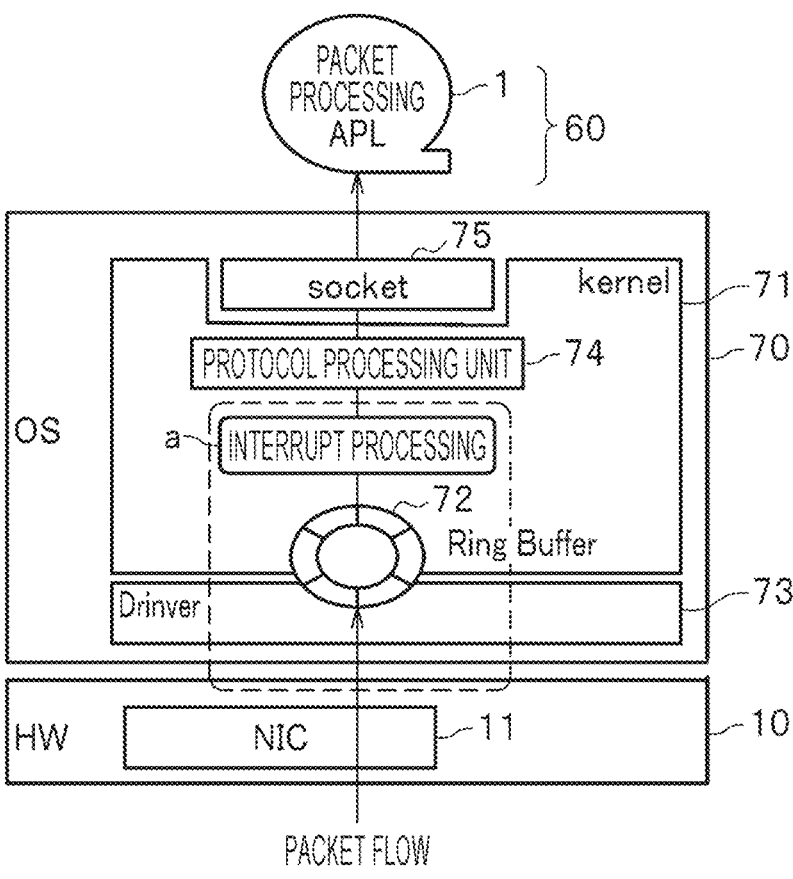

FIG. 22 is a schematic diagram of Rx-side packet processing by a New API (NAPI) implemented in the Linux kernel 2.5/2.6 or later.

Figure 23:
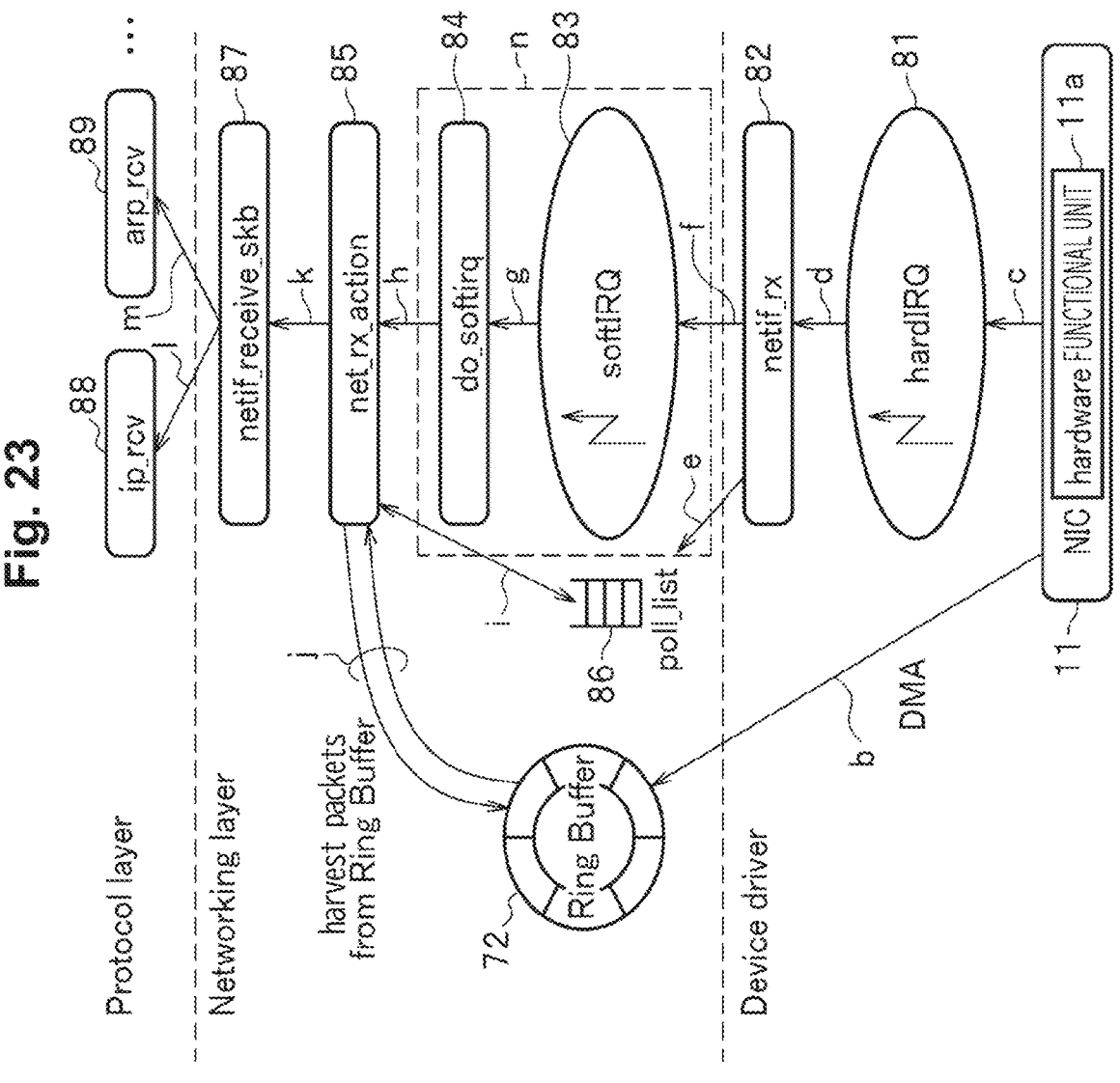

FIG. 23 is a diagram describing an outline of the Rx-side packet processing by the New API (NAPI) for a portion surrounded by a broken line in FIG. 22.

Figure 24:
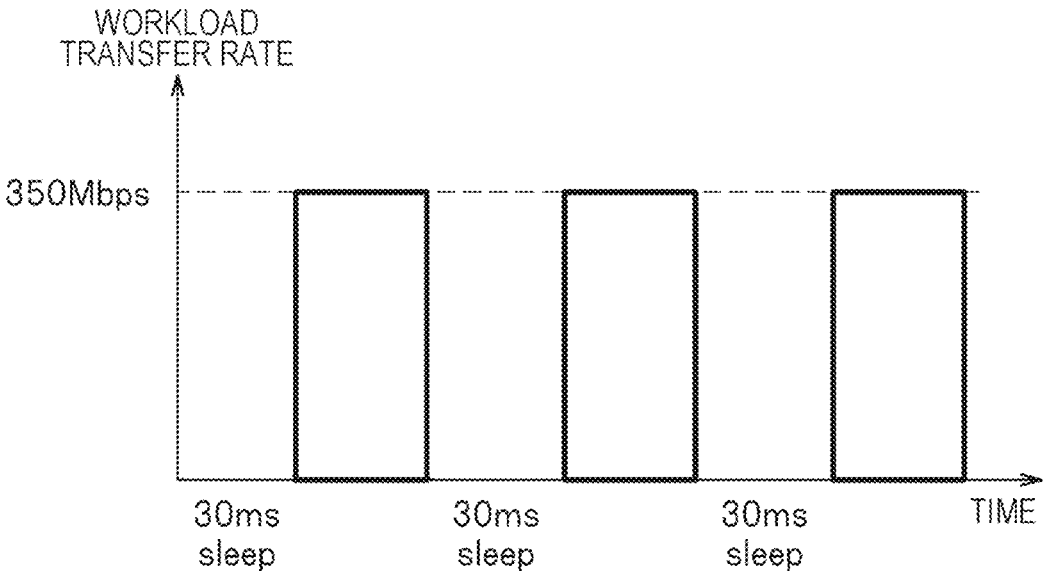

FIG. 24 is a diagram illustrating an example of data transfer of video (30 FPS).

Figure 25:
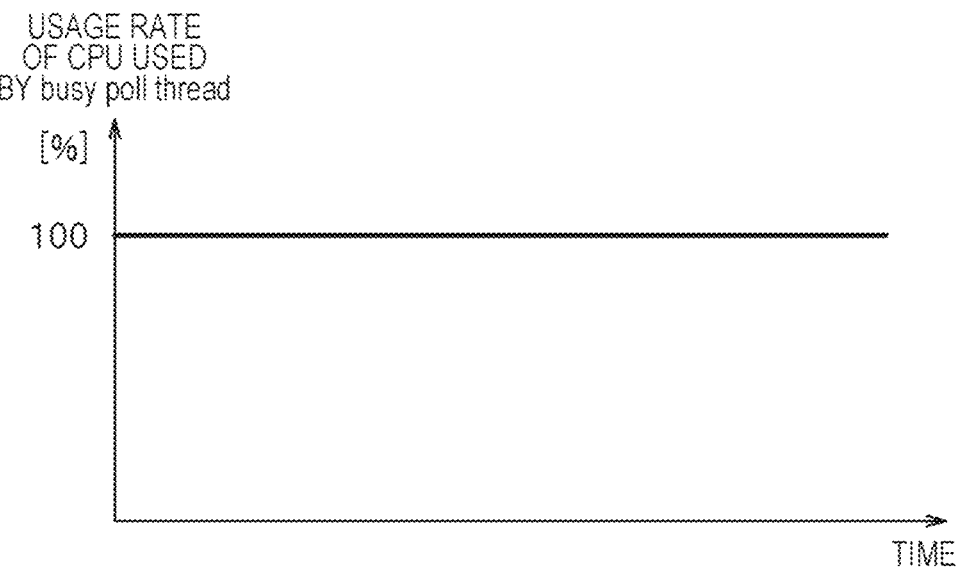

FIG. 25 is a diagram illustrating a usage rate of the CPU that is being used by a busy poll thread in the KBP described in Patent Literature 1.

DESCRIPTION OF EMBODIMENTS

The following is a description of a server delay control system and the like according to a mode for carrying out the present invention (hereinafter referred to as "the present embodiment") with reference to the drawings.

Outline

First embodiment

Figure 1:
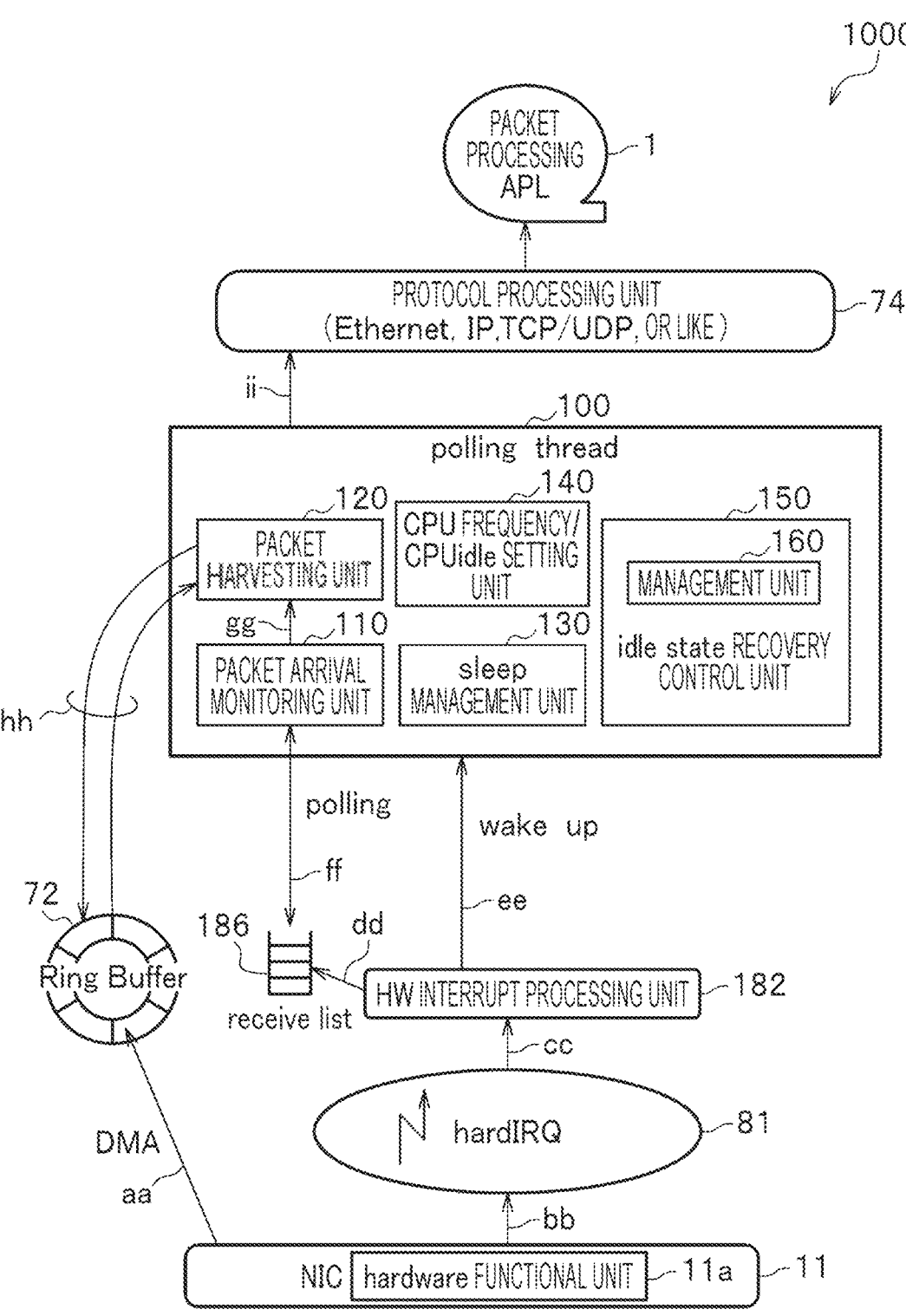
FIG. 1 is a schematic configuration diagram of a server delay control system according to a first embodiment of the present invention.

FIG. 1 is a schematic configuration diagram of a server delay control system according to the first embodiment of the present invention. The present embodiment is an example of application to Rx-side packet processing by a New API (NAPI) implemented in Linux kernel 2.5/2.6 or later. The same components as those in FIG. 22 are denoted by the same reference signs.

As illustrated in FIG. 1, a server delay control system 1000 executes a packet processing APL 1 arranged in a user space that can be used by a user in a server including an OS (a host OS, for example), and performs packet transfer between a NIC 11 that is HW connected to the OS and the packet processing APL 1.

The server delay control system 1000 includes the NIC 11 (physical NIC) which is a network interface card, a hardIRQ 81 which is a handler called in response to issuance of a processing request from the NIC 11 and executes the requested processing (hardware interrupt), a HW interrupt processing unit 182 which is a processing functional unit of a HW interrupt, a receive list 186, a ring buffer 72, a polling thread (server delay controller 100), and a protocol processing unit 74.

The ring buffer 72 is managed by a kernel in a memory space in the server. The ring buffer 72 is a buffer of a certain size that stores messages output from the kernel as a log, and is overwritten starting from the head when its upper limit size is exceeded.

The protocol processing unit 74 is Ethernet, IP, TCP/UDP, or the like. The protocol processing unit 74 performs protocol processing of L2/L3/L4 defined by the OSI reference model, for example.

Server Delay Controller

The server delay controller 100 is a polling thread arranged in either a kernel space or a user space.

The server delay controller 100 includes a packet arrival monitoring unit 110, a packet harvesting unit 120, a sleep management unit 130, a CPU frequency/CPU idle setting unit 140, an idle state recovery control unit 150, and a management unit 160.

The packet arrival monitoring unit 110 is a thread for monitoring whether a packet has arrived. The packet arrival monitoring unit 110 monitors (polling) the receive list 186.

The packet arrival monitoring unit 110 acquires, from the receive list 186, pointer information whose packet exists in the ring buffer 72, and net_device information, and transmits the information (the pointer information and the net_device information) to the packet harvesting unit 120. In a case in which a plurality of pieces of packet information exist in the receive list 186 herein, the plurality of pieces of information are transmitted.

In a case in which a packet has arrived, the packet harvesting unit 120 refers to the packets held in the ring buffer 72, and executes harvesting to delete the entry of the corresponding queue from the ring buffer 72 on the basis of the processing to be performed next (hereinafter, this processing may be referred to simply as harvesting packets from the ring buffer 72). The packet harvesting unit 120 retrieves a packet from the ring buffer 72 on the basis of the received information, and transfers the packet to the protocol processing unit 74.

When a plurality of packets is accumulated in the ring buffer 72, the packet harvesting unit 120 collectively harvests the plurality of packets and passes them to the subsequent protocol processing unit 74. Note that the number of packets harvested at a time is called quota, and is also often called batch processing. The protocol processing unit 74 also performs protocol processing collectively on a plurality of packets, and thus the processing is performed at high speed.

The sleep management unit 130 puts the thread (polling thread) to sleep in a case in which any packet does not arrive for a predetermined period, and cancels the sleep with a hardware interrupt (hardIRQ) of the thread (polling thread) when the packet arrives (described below in detail).

During sleep, the CPU frequency/CPU idle setting unit 140 sets a low frequency as the CPU operation frequency in the CPU core to be used by the thread (polling thread). During the sleep, the CPU frequency/CPU idle setting unit 140 sets the CPU idle state of the CPU core to be used by this thread (polling thread) to a power-saving mode (described below in detail).

The idle state recovery control unit 150 periodically wakes up the thread during the time of sleep, or wakes up the thread immediately before the packet arrival in accordance with the packet arrival timing (described below in detail). An example in which the idle state recovery control unit 150 periodically wakes up during the sleep is described in the present embodiment, and an example in which the idle state recovery control unit 150 wakes up the thread immediately before the packet arrival in accordance with the packet arrival timing is described in the second embodiment.

The management unit 160 selects either periodic wakeup control for periodically waking up the thread during the sleep or pre-wakeup control for waking up the thread immediately before the packet arrival in accordance with the packet arrival timing (described below in detail). In addition, the management unit 160 may select a conventional method without selecting either the periodic wakeup control or the pre-wakeup control.

Arrangement of Server Delay Controller

Figure 2:
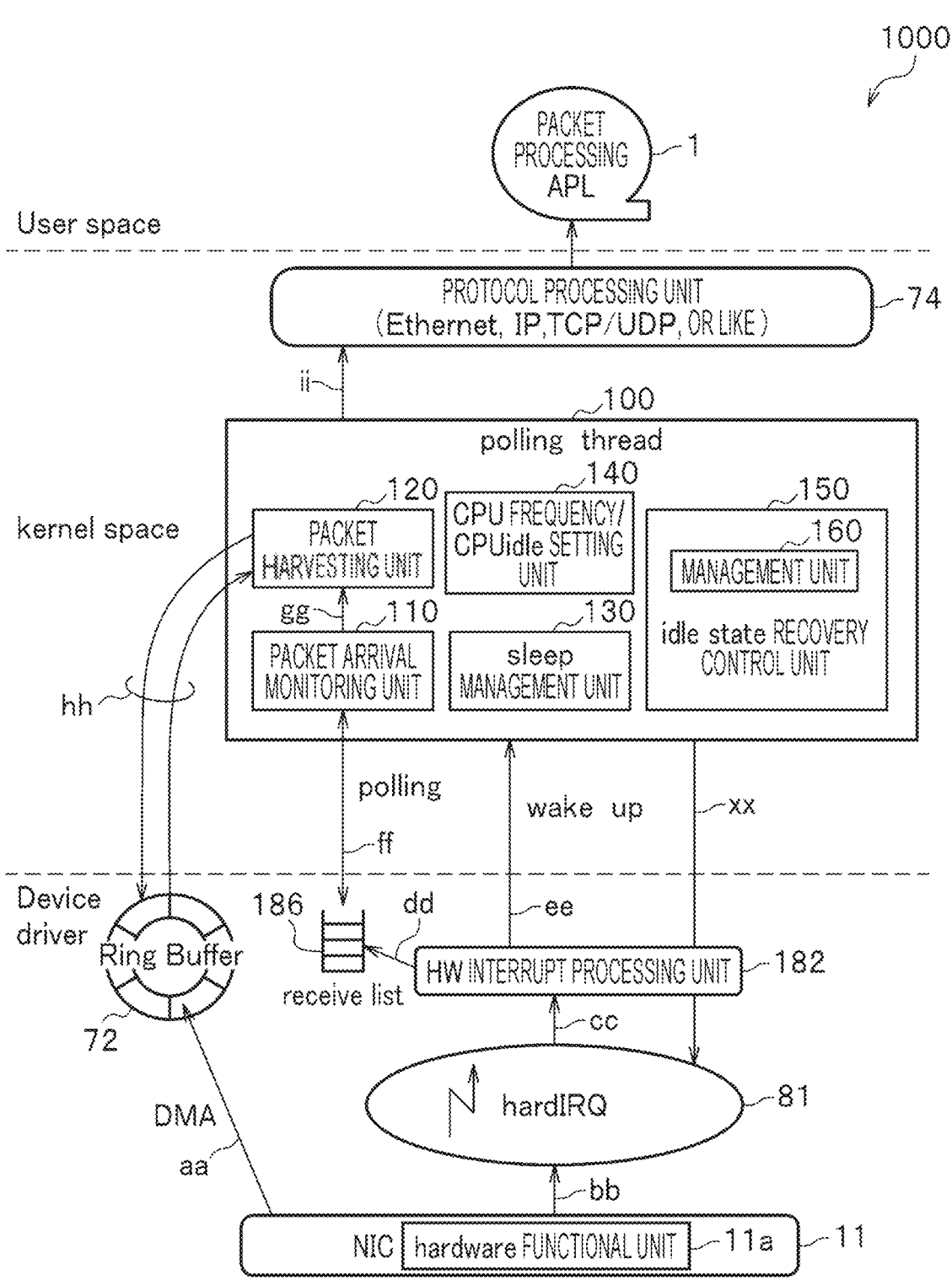
FIG. 2 is a configuration example in which a polling thread (server delay controller) of FIG. 1 is arranged in a kernel space.
Figure 3:
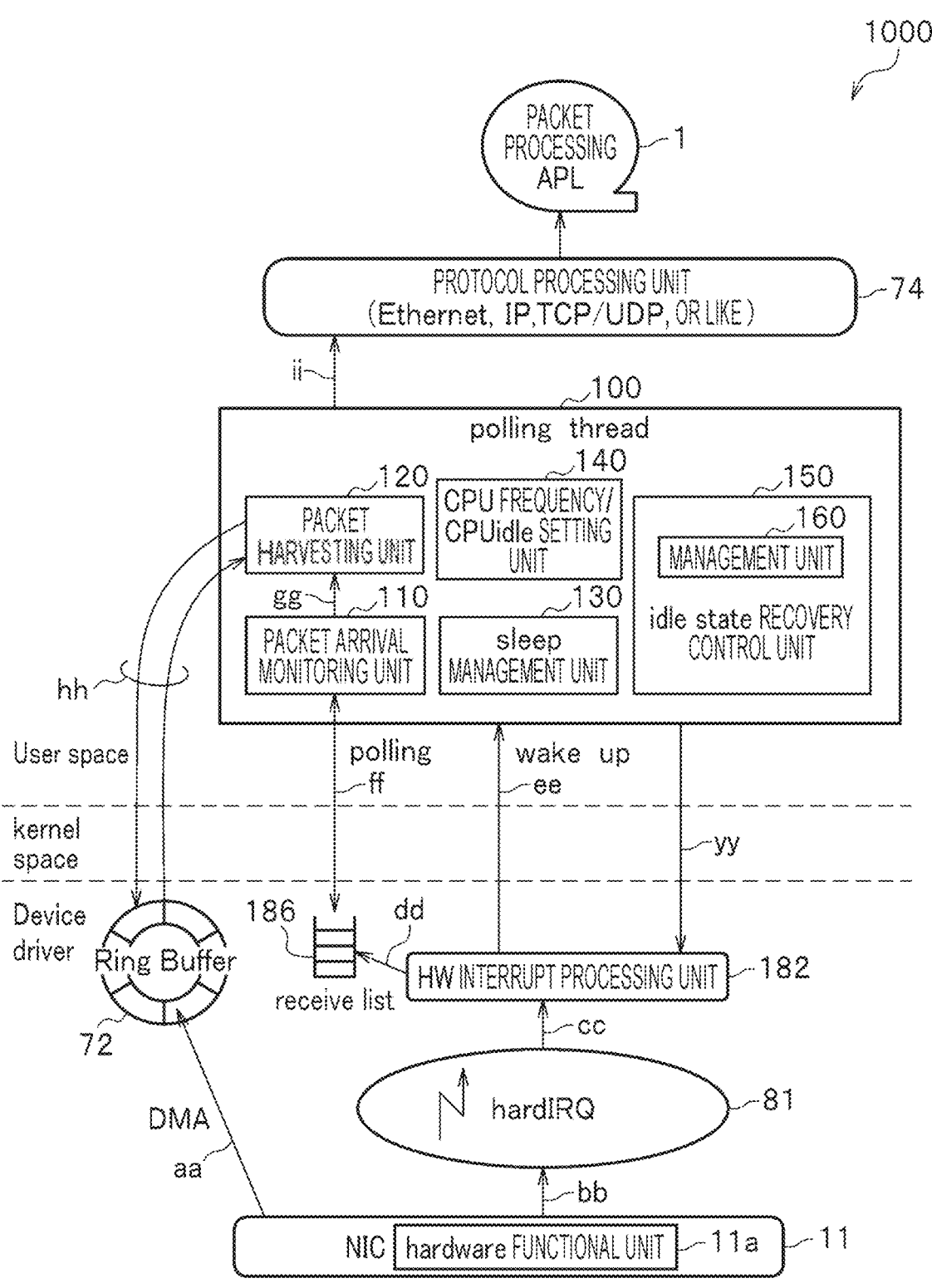
FIG. 3 is a configuration example in which the polling thread (server delay controller) of FIG. 1 is arranged in a user space.

FIGS. 2 and 3 are diagrams describing the arrangement of the polling thread (server delay controller 100) of FIG. 1.

Arrangement of Polling Thread in Kernel Space

FIG. 2 is a configuration example in which the polling thread (server delay controller 100) of FIG. 1 is arranged in a kernel space.

In the server delay control system 1000 illustrated in FIG. 2, the polling thread (server delay controller 100) and the protocol processing unit 74 are arranged in the kernel space. This polling thread (server delay controller 100) operates in the kernel space. The server delay control system 1000 executes the packet processing APL 1 arranged in the user space in the server including the OS, and performs packet transfer between the NIC 11 of the HW and the packet processing APL 1 via the device driver connected to the OS.

Note that as illustrated in FIG. 2, the hardIRQ 81, the HW interrupt processing unit 182, the receive list 186, and the ring buffer 72 are arranged in the device driver.

The device driver is a driver for monitoring hardware.

The idle state recovery control unit 150 of the server delay controller 100 periodically wakes up the thread during sleep, or wakes up the thread immediately before the packet arrival in accordance with the packet arrival timing in the mode in which the polling thread is arranged in the kernel. The idle state recovery control unit 150 manages the HW interrupt and controls sleep and HW interrupt permission/prohibition of the polling thread with respect to the hardIRQ 81 (see reference sign "xx" in FIG. 2).

The present invention can be applied in a case in which there is a polling thread inside the kernel, such as NAPI or KBP.

Arrangement of Polling Thread in User Space

FIG. 3 is a configuration example in which the polling thread (server delay controller 100) of FIG. 1 is arranged in a user space.

In the server delay control system 1000 illustrated in FIG. 3, the polling thread (server delay controller 100) and the protocol processing unit 74 are arranged in the user space. This polling thread (server delay controller 100) operates not in the kernel space but in the user space.

In the server delay control system 1000 illustrated in FIG. 3, the polling thread (server delay controller 100) performs packet transfer between the device driver and the NIC 11 and the packet processing APL 1 while bypassing the kernel space.

The idle state recovery control unit 150 of the server delay controller 100 periodically wakes up the thread during sleep, or wakes up the thread immediately before the packet arrival in accordance with the packet arrival timing in the mode in which the polling thread is arranged in the user space. The idle state recovery control unit 150 manages the HW interrupt and controls sleep and HW interrupt permission/prohibition of the polling thread with respect to the HW interrupt processing unit 182 (see reference sign "yy" in FIG. 3).

The present invention can be applied in a case in which there is a polling thread in a user space, such as the DPDK.

An operation of the server delay control system 1000 configured as described above is described below.

The present invention can be applied in either a case in which there is a polling thread inside the kernel, such as NAPI or KBP, or a case in which there is a polling thread in the user space, such as DPDK. An application in a case in which there is a polling thread inside the kernel is described as an example.

Rx-Side Packet Processing Operation According to Present Invention

Arrows (reference signs) "aa" to "ii" in FIGS. 1 to 3 indicate the flow of Rx-side packet processing.

When receiving a packet (or a frame) in a frame from a counterpart device, the NIC 11 copies a packet that has arrived at the ring buffer 72 by DMA transfer without using the CPU (see reference sign "aa" in FIGS. 1 to 3). The ring buffer 72 is managed by "Device driver".

When a packet arrives, the NIC 11 puts a hardware interrupt (hardIRQ) into the hardIRQ 81 (handler) (see reference sign "bb" in FIGS. 1 to 3), and the HW interrupt processing unit 182 executes the processing described below to recognize the packet.

When the hardIRQ 81 (handler) starts (see reference sign "cc" in FIG. 1), the HW interrupt processing unit 182 stores, into the receive list 186, net device information (net_device) indicating which device the hardware interrupt from the NIC 11 comes from, which is one piece of information contained in the hardware interrupt (hardIRQ), and registers queue harvesting information. Specifically, when packets are packed into the ring buffer 72, the HW interrupt processing unit 182 registers harvesting of a subsequent queue in the receive list 186 by using a driver of the NIC 11 (see reference sign "dd" in FIGS. 1 to 3). Thus, the queue harvesting due to the packets packed into the ring buffer 72 is registered in the receive list 186.

The HW interrupt processing unit 182 registers net_device in the receive list 186, but, unlike the netif_rx 82 in FIG. 23, does not schedule a software interrupt (softIRQ). That is, the HW interrupt processing unit 182 differs from the netif_rx 82 in FIG. 23 in that it does not schedule a software interrupt (softIRQ).

In addition, the HW interrupt processing unit 182 cancels the sleep to awake the polling thread in a sleep state (see reference sign "ee" in FIGS. 1 to 3).

By this point, the hardware interrupt processing in the "Device driver" in FIGS. 1 to 3 is stopped.

In the present embodiment, in "Networking layer" illustrated in FIG. 23, the softIRQ 83 and the do_softirq 84 are deleted, and accordingly, the netif_rx 82 illustrated in FIG. 23 does not send a notification of a start of the softIRQ 83 (handler) (see reference sign "f" in FIG. 23).

In the present embodiment, the server delay control system 1000 deletes the softIRQ 83 and the do_softirq 84 illustrated in FIG. 23, and instead, includes the polling thread (server delay controller 100) in the "kernel space" (see FIG. 2). Alternatively, the server delay control system 1000 includes the polling thread (server delay controller 100) in the "User space" (see FIG. 3).

The packet arrival monitoring unit 110 monitors (polling) the receive list 186 (see reference sign "ff" in FIGS. 1 to 3), and confirms whether there is packet arrival.

The packet arrival monitoring unit 110 acquires, from the receive list 186, pointer information whose packet exists in the ring buffer 72, and net_device information, transmits the information (the pointer information and the net_device information) to the packet harvesting unit 120 (see reference sign "gg" in FIGS. 1 to 3). In a case in which a plurality of pieces of packet information exist in the receive list 186 herein, the plurality of pieces of information are transmitted.

In a case in which a packet has arrived, the packet harvesting unit 120 of the server delay controller 100 harvests the packet from the ring buffer 72 (see reference sign hh in FIGS. 1 to 3).

The packet harvesting unit 120 retrieves a packet from the ring buffer 72 on the basis of the received information, and transfers the packet to the protocol processing unit 74 (see reference sign ii in FIGS. 1 to 3).

Sleep Operation of Polling Thread

The server delay control system 1000 stops the softIRQ of packet processing, which is a main cause of occurrence of NW delay, and executes the polling thread so that the packet arrival monitoring unit 110 of the server delay controller 100 monitors packet arrival. The packet harvesting unit 120 then performs packet processing with a polling model (without softIRQ) at the time of packet arrival.

The polling thread (server delay controller 100) that monitors packet arrival can sleep while there is no packet arrival.

The polling thread (server delay controller 100) sleeps in accordance with the presence/absence of packet arrival, and cancels the sleep through the hardIRQ 81 at the time of packet arrival. Specifically, the sleep management unit 130 of the server delay controller 100 puts the polling thread to sleep in accordance with the presence/absence of packet arrival, or when there is no packet arrival for a predetermined period. The sleep management unit 130 cancels the sleep through the hardIRQ 81 at the time of packet arrival. As a result, softIRQ contention is avoided, and lower delay is achieved.

The CPU frequency/CPU idle setting unit 140 of the server delay controller 100 changes the CPU operation frequency and the idle setting in accordance with the presence/absence of packet arrival. Specifically, the CPU frequency/CPU idle setting unit 140 lowers the CPU frequency during sleep, and raises the CPU frequency at the time of restart (returns the CPU operation frequency to its original frequency). In addition, the CPU frequency/CPU idle setting unit 140 changes the CPU idle setting to power saving during sleep. Power saving is also achieved by changing the CPU operation frequency to a lower frequency during sleep, or changing the CPU idle setting to power saving.

Figure 4:
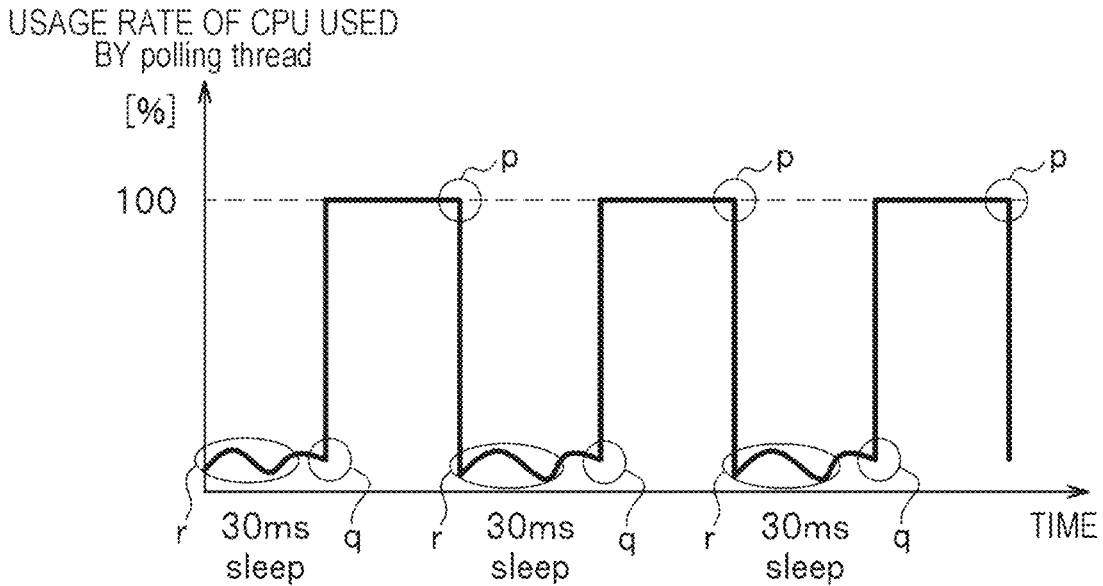
FIG. 4 is a diagram illustrating an example of operation of the polling thread of the server delay controller of the server delay control system according to the first embodiment of the present invention.

FIG. 4 is a diagram illustrating an example of operation of the polling thread of the server delay controller 100. The ordinate axis indicates the CPU usage rate [%] of the CPU core used by the polling thread, and the abscissa axis indicates time. Note that FIG. 4 illustrates an example of operation of a polling thread depending on packet arrival corresponding to the example of data transfer of the video (30 FPS) whose packets are intermittently received as illustrated in FIG. 24.

As illustrated in FIG. 4, the sleep management unit 130 of the server delay controller 100 puts the polling thread to sleep (see reference sign p in FIG. 4) in a case in which there is no packet arrival for a predetermined period (more specifically, in a case in which there is no next packet arrival even after a fixed value (a certain period) determined in advance by a maintenance personnel/operator has elapsed since the arrival of a certain packet). The sleep management unit 130 then activates the polling thread through the hardIRQ 81 when a packet arrives (see reference sign "q" in FIG. 4).

Note that, during sleep, the kernel thread does not occupy the CPU core, and therefore, the CPU usage rate of the CPU core to be used by the polling thread may fluctuate (see reference sign "r" in FIG. 4) when a timer interrupt for stabilizing the system operation enters the corresponding CPU core, or when a migration thread for performing error processing or the like enters the corresponding CPU core, instead of when the polling thread uses the CPU core.

Low Power Idle (LPI) Hardware Control

The CPU has a function of controlling an idle state of the CPU by hardware control, which is called an LPI. The LPI is often referred to as CPU idle or C-state, and hereinafter, the LPI is described as C-state.

In the C-state, when the CPU load decreases, power saving is attempted by turning off a part of the circuit of the CPU.

FIG. 5 is a diagram illustrating a table of an example of states of the C-state. Note that because the state definition varies depending on the CPU hardware, FIG. 5 is merely a reference example.

As illustrated in FIG. 5, there are grades C0 to C6 in the CPU idle state, and the CPU idle state transitions to a deep sleep state as the time during which no load is on the CPU becomes longer. The CPU power consumption becomes smaller in a deeper sleep state, but on the other hand, the time required for the recovery becomes longer accordingly, which may be a problem from the viewpoint of low delay.

In addition, what depth to which the CPU idle state transitions is determined by hardware control of the CPU and depends on a CPU product (in many cases, it cannot be controlled by software such as kernel).

Relationship Between Sleep Control and State of C-State

When the polling thread is controlled to sleep, the CPU transitions to an idle state (each state of the C-state) by hardware control of the LPI during a period in which there is no inflow of traffic.

The longer the period during which there is no traffic, the state falls into a deeper idle state. In this case, logic is CPU hardware dependent (CPU product dependent) and cannot be controlled by software.

Figure 6:
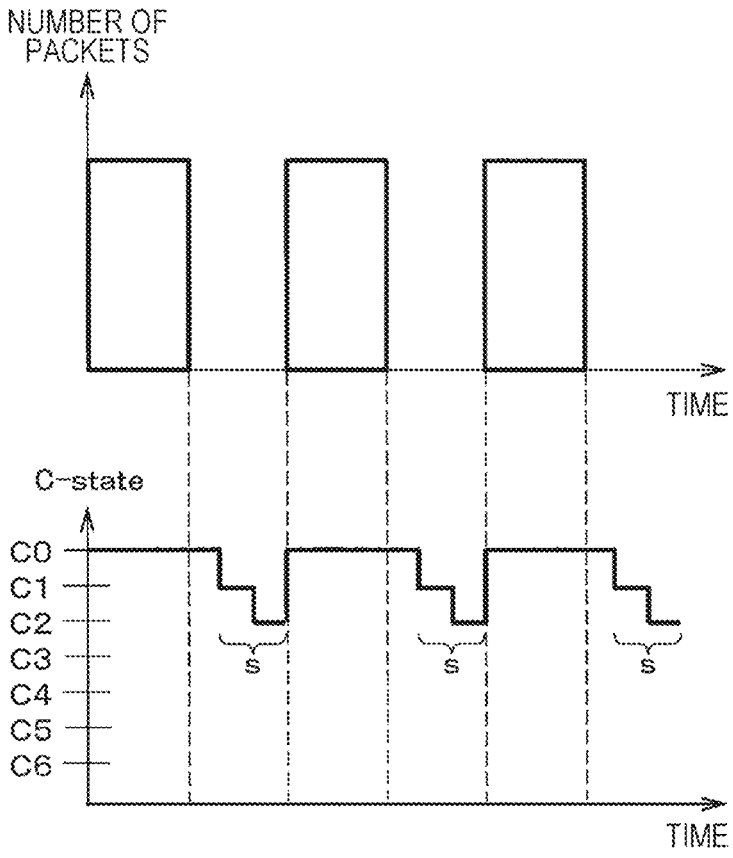
FIG. 6 is a diagram illustrating a traffic image and a C-state transition image of a polling thread in a case in which packet arrival intervals of the server delay control system according to the first embodiment of the present invention are dense.

FIG. 6 is a diagram illustrating a traffic image (upper diagram of FIG. 6) and a C-state transition image (lower diagram of FIG. 6) of a polling thread in a case in which packet arrival intervals are dense.

When the packet arrival intervals illustrated in the upper diagram of FIG. 6 are dense, the transition to the idle state (each state of the C-state) is up to C2 of the C-state (see reference sign "s" in the lower diagram of FIG. 6).

Figure 7:
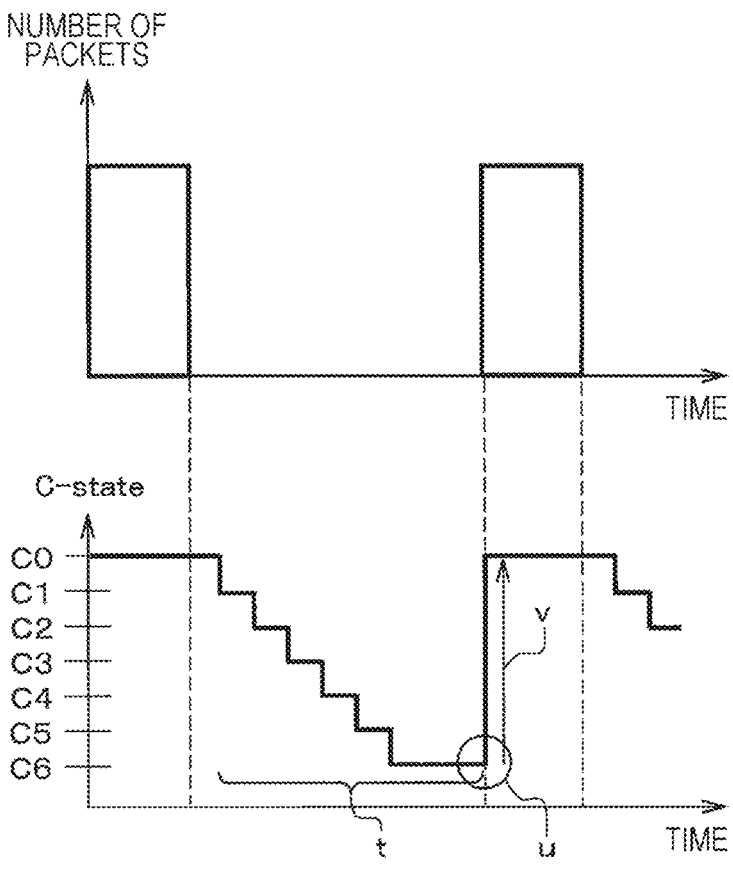
FIG. 7 is a diagram illustrating a traffic image and a C-state transition image of a polling thread in a case in which packet arrival intervals of the server delay control system according to the first embodiment of the present invention are sparse.

FIG. 7 is a diagram illustrating a traffic image (upper diagram of FIG. 7) and a C-state transition image (lower diagram of FIG. 7) of a polling thread in a case in which packet arrival intervals are sparse.

In a case in which the packet arrival interval illustrated in the upper diagram of FIG. 7 is sparse, the transition to the idle state (each state of the C-state) falls into a deeper idle state (here, the highest grade C6) (see reference sign "u" in the lower diagram of FIG. 7) as the period in which there is no traffic is long (see reference sign "t" in the lower diagram of FIG. 7).

When the packet arrival interval is sparse, because the state falls into a deep idle state, it takes time to recover (wake up from deep sleep) (see the arrow "v" in the lower diagram of FIG. 7).

As described above, in the case of the traffic in which the packet arrival is sparse, there is a problem that the state falls into a deep idle state and it takes time to recover, which causes a delay (latency) of the packet transfer processing.

Basic Concept of Polling Thread (Server Delay Controller 100) Operation

A basic concept of the polling thread (server delay controller 100) operation is described with reference to FIGS. 8 and 9.

Figure 8:
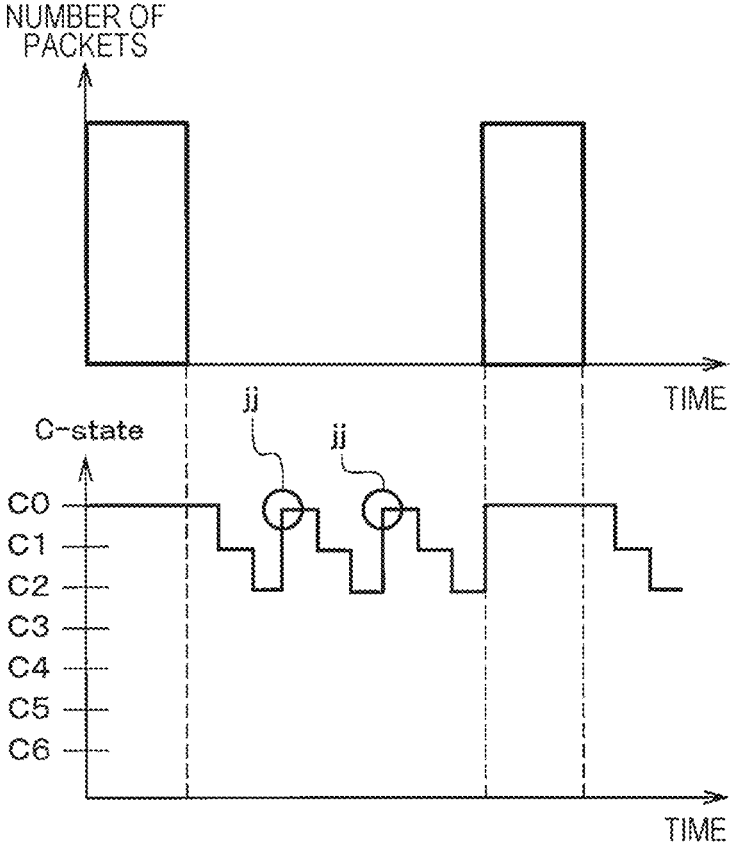
FIG. 8 is a diagram illustrating a traffic image, and a C-state transition image of a polling thread and a polling thread wakeup when <periodically waking up polling thread> (Method 1) of the server delay control system according to the first embodiment of the present invention.
Figure 9:
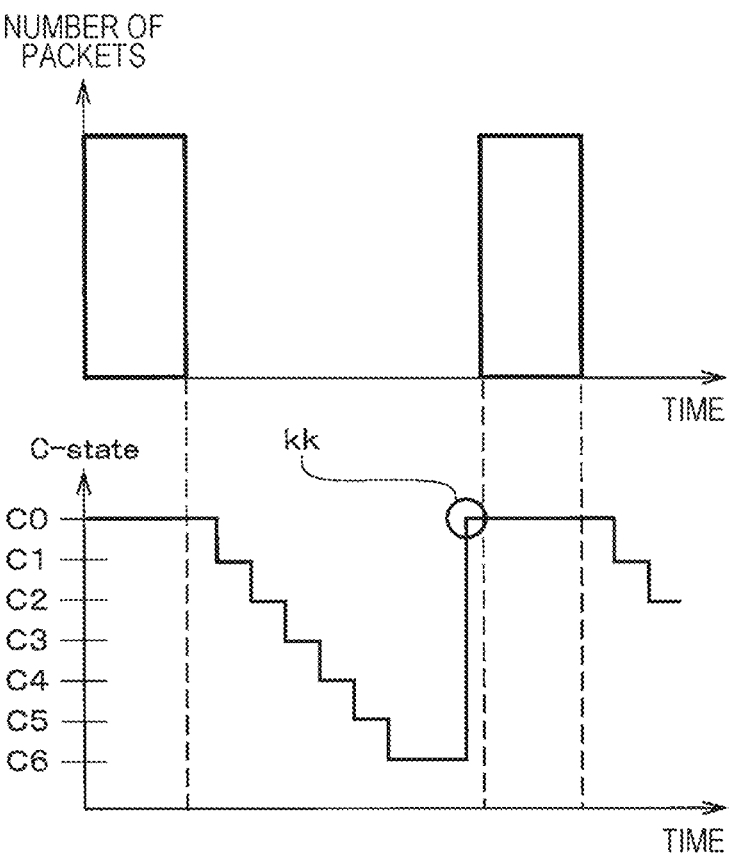
FIG. 9 is a diagram illustrating a traffic image, and a C-state transition image of a polling thread and a polling thread wakeup when "waking up polling thread in advance" (Method 2) of the server delay control system according to the first embodiment of the present invention.

The present invention periodically wakes up a polling thread in a sleep state so that a period during which there is no arrival of packets becomes long and the CPU idle state does not become deep (Method <1>) (FIG. 8), or wakes up a polling thread in advance (Method <2>) (FIG. 9). Note that, in the case of Method <2> of waking up a polling thread in advance, for example, a timer is used for the wakeup timing.

Method <1> of periodically waking up a polling thread is described in the present embodiment, and Method <2> of waking up a polling thread in advance is described below in the second embodiment.

Periodically Waking Up Polling Thread> (Method <1>)

FIG. 8 is a diagram illustrating a traffic image (upper diagram of FIG. 8), and a C-state transition image of a polling thread and a polling thread wakeup (lower diagram of FIG. 8) when <periodically waking up polling thread> (Method <1>).

In the case of a traffic in which the packet arrival is sparse illustrated in the upper diagram of FIG. 8, the polling thread is periodically woken up ("periodic wakeup") as indicated by reference sign "jj"0 in the lower diagram of FIG. 8. The periodic wakeup prevents falling into a deep idle state. In the conventional example, in a case in which the packet arrival interval is sparse, because the state falls into a deep idle state (see the arrow "t" in the lower diagram of FIG. 7), it takes much time to recover (see the arrow "v" in the lower diagram of FIG. 7). On the other hand, in Method <1>, in a case in which the packet arrival interval is sparse, the polling thread is periodically woken up so that the CPU idle state does not become deep ("periodic wakeup"). As a result, the state does not fall into a deep CPU idle state, and the recovery time from the idle state can be speeded up.

<Waking up Polling Thread in Advance> (Method <2>)

FIG. 9 is a diagram illustrating a traffic image (upper diagram of FIG. 9), and a C-state transition image of a polling thread and a polling thread wakeup (lower diagram of FIG. 9) when <waking up polling thread in advance> (Method <2>).

In the case of a traffic in which the packet arrival is sparse illustrated in the upper diagram of FIG. 9, the polling thread is woken up in advance ("pre-wakeup") by, for example, a timer as indicated by reference sign "kk" in the lower diagram of FIG. 9. In the pre-wakeup, wakeup is performed to recover the C-state immediately before packet arrival, thereby speeding up the recovery time from the idle state, while causing the state to fall into a deep idle state to acquire the power saving effect as much as possible.

<Comparison Between "Periodic Wakeup" (Method <1>) and "Pre-Wakeup" (Method <2>)>

The "periodic wakeup" (Method <1>) is suitable for use in a case in which the packet arrival timing cannot be predicted.

The "pre-wakeup" (Method <2>) is suitable for use in a case in which the packet arrival timing can be predicted. A case in which the packet arrival timing can be predicted is, for example, a radio access network (RAN).

Here, by performing only the processing of waking up at the time of periodic wakeup/pre-wakeup, it is possible to avoid unnecessary consumption of the CPU cycle and to suppress an increase in power consumption due to wakeup as much as possible.

Operation Flow of Polling Thread (Server Delay Controller 100)

Method Selection Processing

Figure 10:
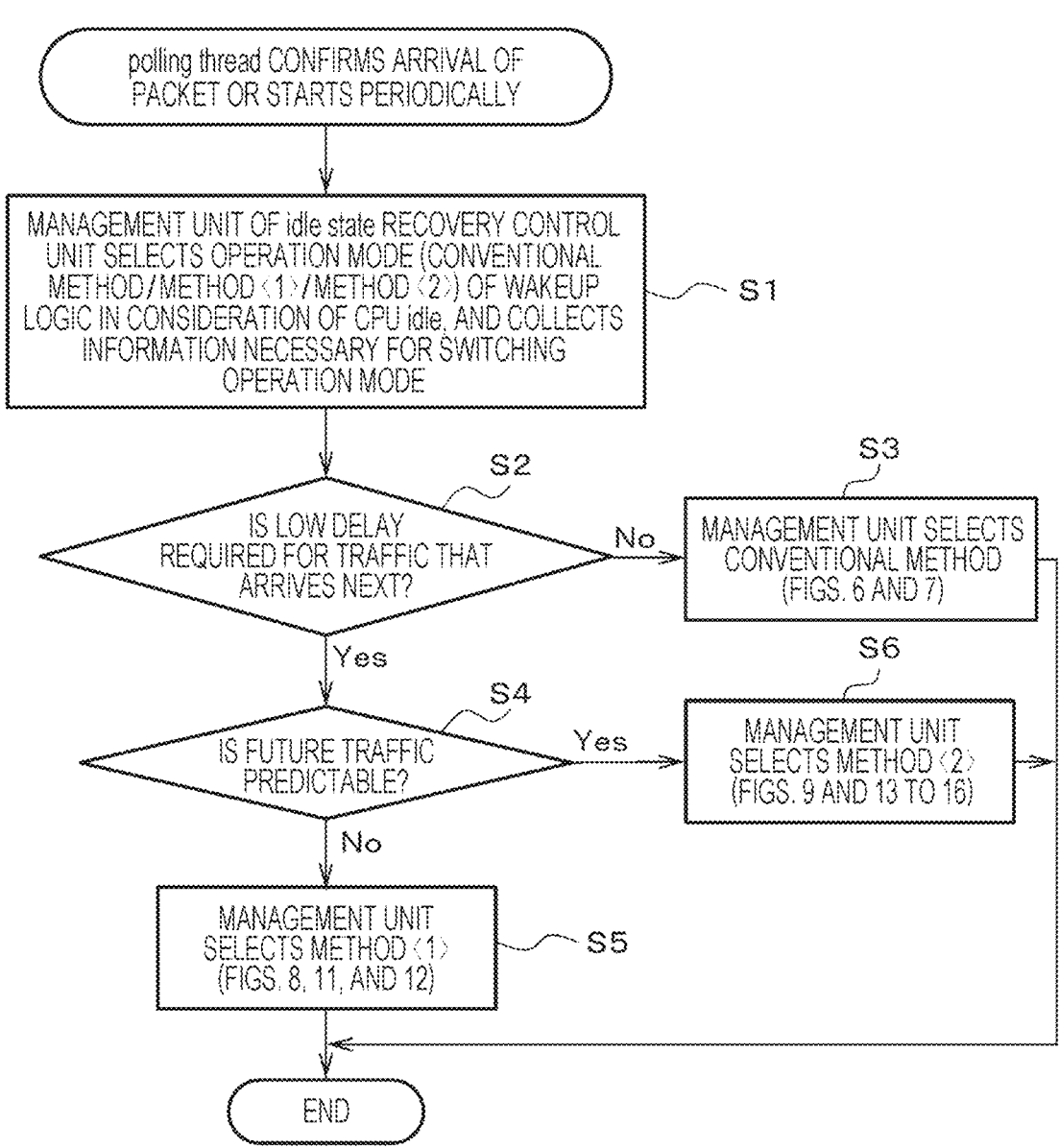
FIG. 10 is a flowchart indicating a method selection processing of a management unit of an idle state recovery control unit of the server delay controller of the server delay control system according to the first embodiment of the present invention.

FIG. 10 is a flowchart indicating method selection processing of the management unit 160 of the idle state recovery control unit 150 of the polling thread (server delay controller 100).

In step S1, the management unit 160 of the idle state recovery control unit 150 selects an operation mode (conventional method/Method <1>/Method <2>) of the wakeup logic in consideration of the CPU idle, and collects information necessary for switching the operation mode. The management unit 160 collects, for example, data measured by a traffic measurement unit 220 (FIG. 13), traffic patterns known in advance as provided service specifications, planned event information regarding user behavior, and the like, and selects (conventional method/Method <1>/Method <2>).

In step S2, the management unit 160 determines whether low delay is required for the traffic that arrives next.

When low delay is not required for the traffic that arrives next (S2: No), in step S3, the management unit 160 determines that it is not necessary to perform control in consideration of low delay, selects the conventional method, and ends the processing of the present flow.

When low delay is required for the traffic that arrives next (S2: Yes), in step S4, the management unit 160 determines whether or not future traffic is predictable.

When the future traffic is not predictable (S4: No), in step S5, the management unit 160 selects Method <1> and ends the processing of the present flow.

When the future traffic is predictable (S4: Yes), in step S6, the management unit 160 selects Method <2> and ends the processing of the present flow.

NIC and HW Interrupt Processing

Figure 11:
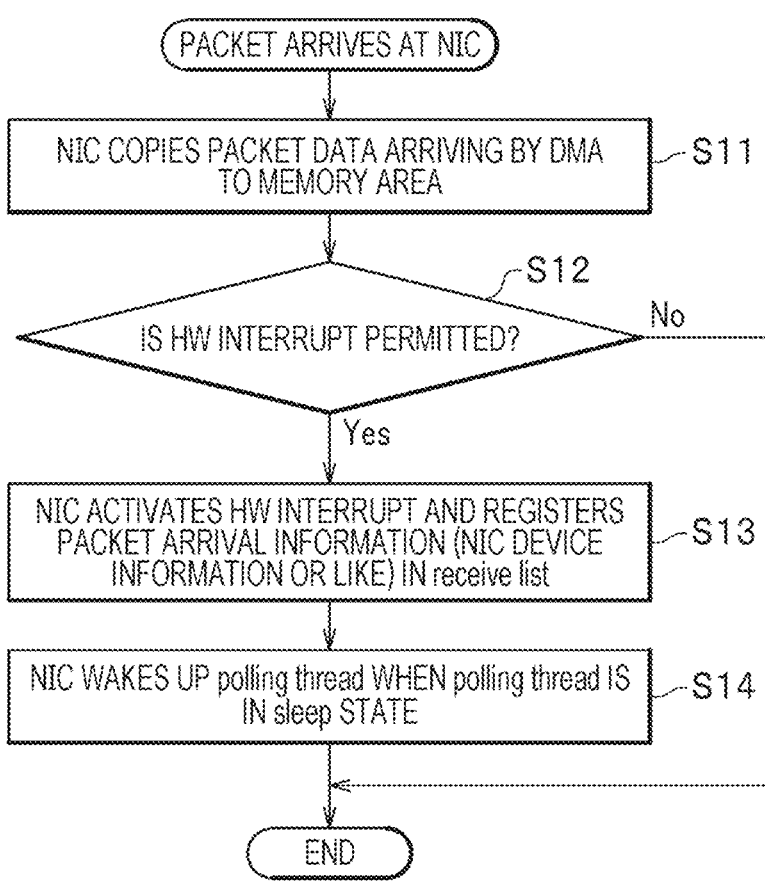
FIG. 11 is a flowchart indicating a NIC and HW interrupt processing of the server delay controller of the server delay control system according to the first embodiment of the present invention.

FIG. 11 is a flowchart indicating NIC and HW interrupt processing of the polling thread (server delay controller).

While the polling thread is activated, the present operation flow is executed in a loop.

When a packet arrives at the NIC 11, the present flow is started. In step S11, the NIC 11 copies the packet data arriving by direct memory access (DMA) to the memory area.

In step S12, the polling thread (server delay controller 100) determines whether or not a HW interrupt is permitted. When the HW interrupt is permitted (S12: Yes), the processing proceeds to step S13, and when the HW interrupt is not permitted (S12: No), the processing of the present flow is ended.

In step S13, the NIC 11 activates a HW interrupt by putting a HW interrupt (hardIRQ) into the hardIRQ 81 (handler), and registers packet arrival information (NIC device information or the like) in the receive list 186.

In step S14, when the polling thread (server delay controller 100) is in a sleep state, the NIC 11 awakes the polling thread and ends the processing of the present flow.

Operation Flow of Polling Thread

Figure 12:
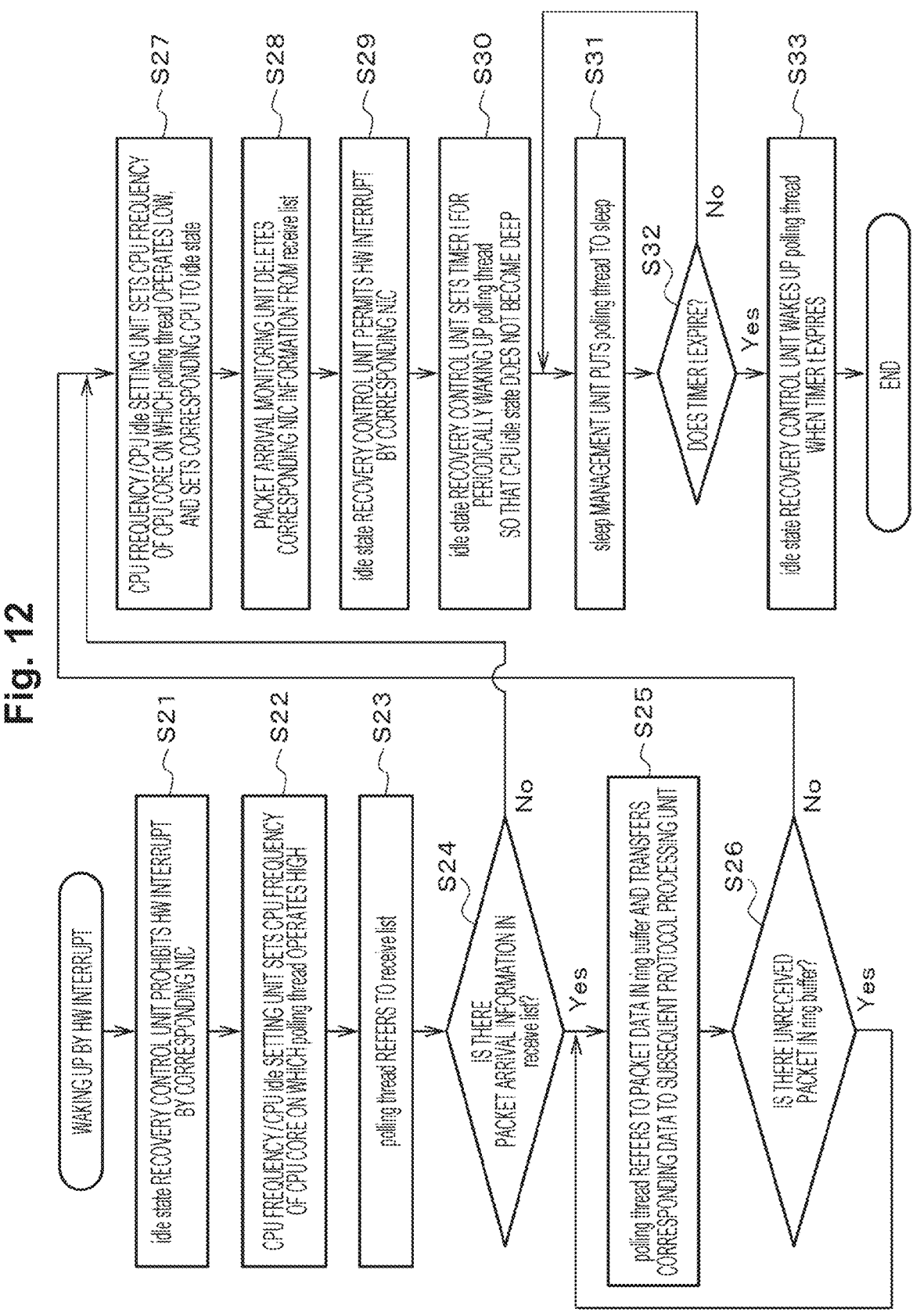
FIG. 12 is a flowchart indicating a processing of an operation mode of a wakeup logic in consideration of CPU idle of the server delay controller of the server delay control system according to the first embodiment of the present invention.

FIG. 12 is a flowchart indicating processing of an operation mode of a wakeup logic in consideration of CPU idle of the polling thread (server delay controller).

When the polling thread is in a sleep state, a packet arrives, the polling thread is awoken by a HW interrupt (HW interrupt of point 1), and the present flow starts.

In step S21, the idle state recovery control unit 150 prohibits another HW interrupt by the NIC 11. When another HW interrupt is activated during the interrupt processing, the processing is interrupted. Therefore, the idle state recovery control unit 150 temporarily prohibits the HW interrupt by the NIC 11.

In step S22, the CPU frequency/CPU idle setting unit 140 sets the CPU frequency of the CPU core on which the polling thread operates high, and cancels an idle state when the corresponding CPU is in an idle state.

In step S23, the polling thread refers to the receive list 186. The polling thread finds out from which device the HW interrupt has occurred and confirms the packet arrival information in the receive list 186 in the next step S24.

Note that the presence/absence of the packet arrival may be confirmed by directly referring to the ring buffer 72 instead of referring to the Control Plane list called the receive list 186. For example, in the NAPI implemented in the Linux kernel, a Control Plane list called the poll list is monitored.

In step S24, the packet arrival monitoring unit 110 determines whether packet arrival information is present in the receive list 186. When packet arrival information is not present in the receive list 186 (S24: No), that is, when there is no packet to be processed, the following processing is skipped, and the processing proceeds to step S27.

Note that when the C-state does not transition to C0 or the like only by waking up the polling thread, light calculation may be performed here to apply a load to the CPU. In addition, a CPU load is applied by executing the flow generated by the HW interrupt. Therefore, a flow similar to that in the case of being generated by the HW interrupt of point 1 may be executed.

When packet arrival information is present in the receive list 186 (S24: Yes), the polling thread refers to packet data in the ring buffer 72 and transfers the corresponding data to the subsequent protocol processing unit 74 in step S25. Here, when there are a plurality of pieces of data, reception processing may be performed collectively.

In step S26, the packet harvesting unit 120 determines whether there is an unreceived packet in the ring buffer 72. When there is an unreceived packet in the ring buffer 72 (S26: Yes), the processing returns to step S25 described above.

In a case in which there is no unreceived packet in the ring buffer 72 (S26: No), in step S27, the CPU frequency/CPU idle setting unit 140 sets the CPU frequency of the CPU core on which the polling thread operates low, and sets the corresponding CPU to an idle state.

In step S28, the packet arrival monitoring unit 110 deletes the corresponding NIC information from the receive list 186.

In step S29, the idle state recovery control unit 150 permits a HW interrupt by the NIC.

In step S30, the idle state recovery control unit 150 sets a timer t for periodically waking up the polling thread so that the CPU idle state does not become deep.

The above-described t may be set in advance by the operator according to specifications such as a time required for transition of the C-state by hardware control of the CPU and a time required for recovery from each idle state.

In addition, in a case in which they dynamically change, the state information of the C-state may be acquired from the CPU, state transition time of the C-state may be learned from traffic conditions or the like, and t may be dynamically determined from the learned time.

In step S31, the sleep management unit 130 puts the polling thread to sleep.

In step S32, the idle state recovery control unit 150 determines whether or not the timer t expires, and in a case in which the timer t does not expire (S32: No), the processing returns to step S31. In a case in which the timer t expires (S32: Yes), the processing proceeds to step S33.

In step S33, the idle state recovery control unit 150 wakes up the polling thread when the timer t expires, and ends the processing of the present flow.

When the timer t expires, the polling thread wakes up (only by waking up, the C-state recovers to C0 or the like).

Thereafter, timer wakeup/sleep is repeated, and when a packet arrives during this repetition, a HW interrupt is activated and transition is made to (HW interrupt of point 1: start of flow of FIG. 10).

Second Embodiment

The second embodiment of the present invention is an example in which the above-described "pre-wakeup" (Method <2>) is applied.

Figure 13:
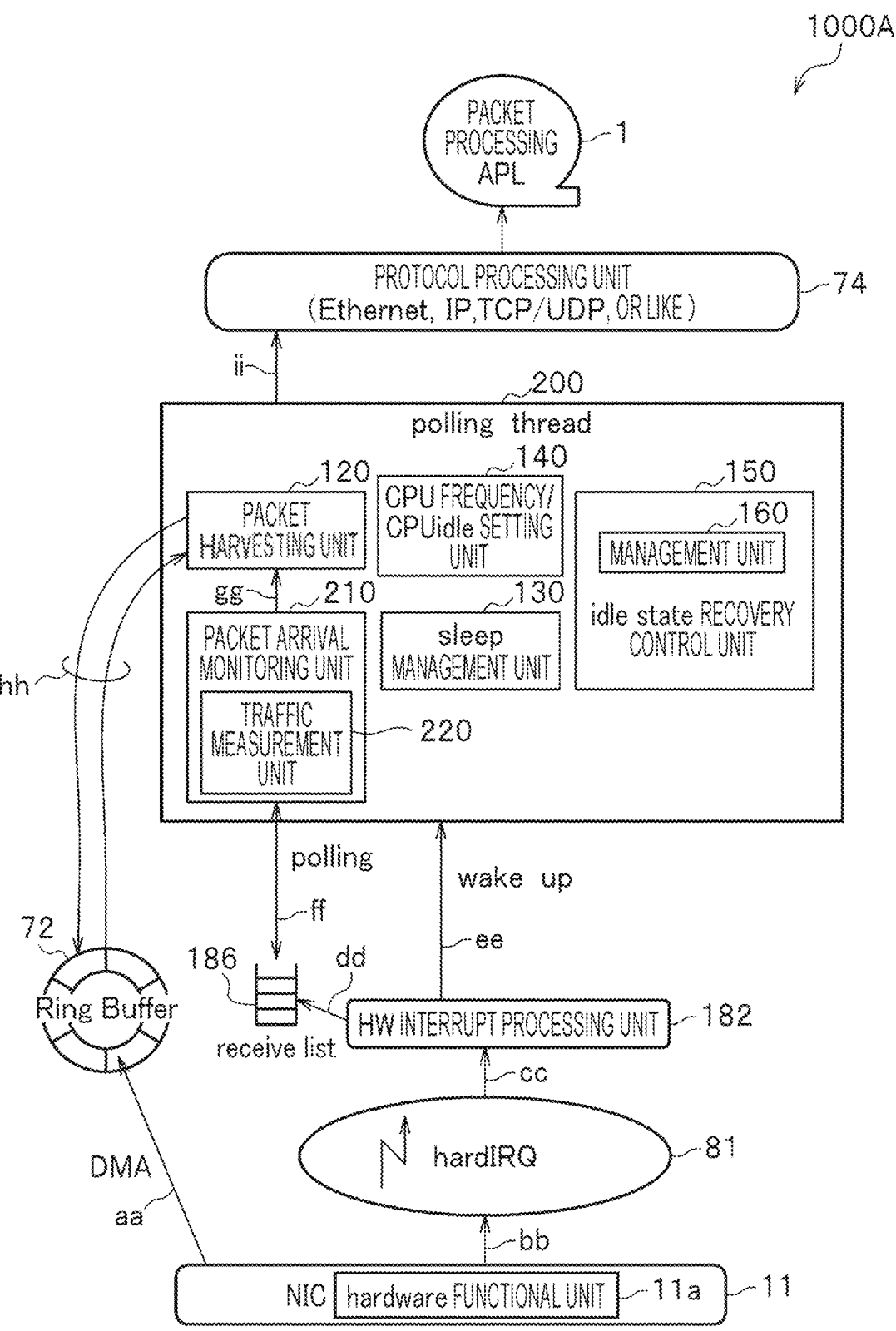
FIG. 13 is a schematic configuration diagram of a server delay control system according to a second embodiment of the present invention.

FIG. 13 is a schematic configuration diagram of a server delay control system according to the second embodiment of the present invention. The same components as those in FIG. 1 are denoted by the same reference signs.

As illustrated in FIG. 13, a server delay control system 1000A includes a server delay controller device 200.

The server delay control device 200 is a polling thread arranged in either a kernel space or a user space.

The server delay controller 200 further includes a packet arrival monitoring unit 210 and a traffic measurement unit 220 on the basis of the server delay controller 100 of FIG. 1.

The packet arrival monitoring unit 210 has a function similar to that of the packet arrival monitoring unit 110 of FIG. 1.

The traffic measurement unit 220 measures traffic of inflow and outflow packets such as packet arrival.

Specific Design Example of Timer t

As described above, the "pre-wakeup" (Method <2>) is suitable for use in a case in which the packet arrival timing can be predicted. A case in which the packet arrival timing can be predicted is, for example, the RAN.

When the packet arrival timing can be predicted, the timer t can be set. Hereinafter, the case of vRAN use case is taken as an example. Specifically, a design example of the timer t in an uplink interface in FrontHaul of the RAN which is a target use case of Method <2>is described.

Figure 14:
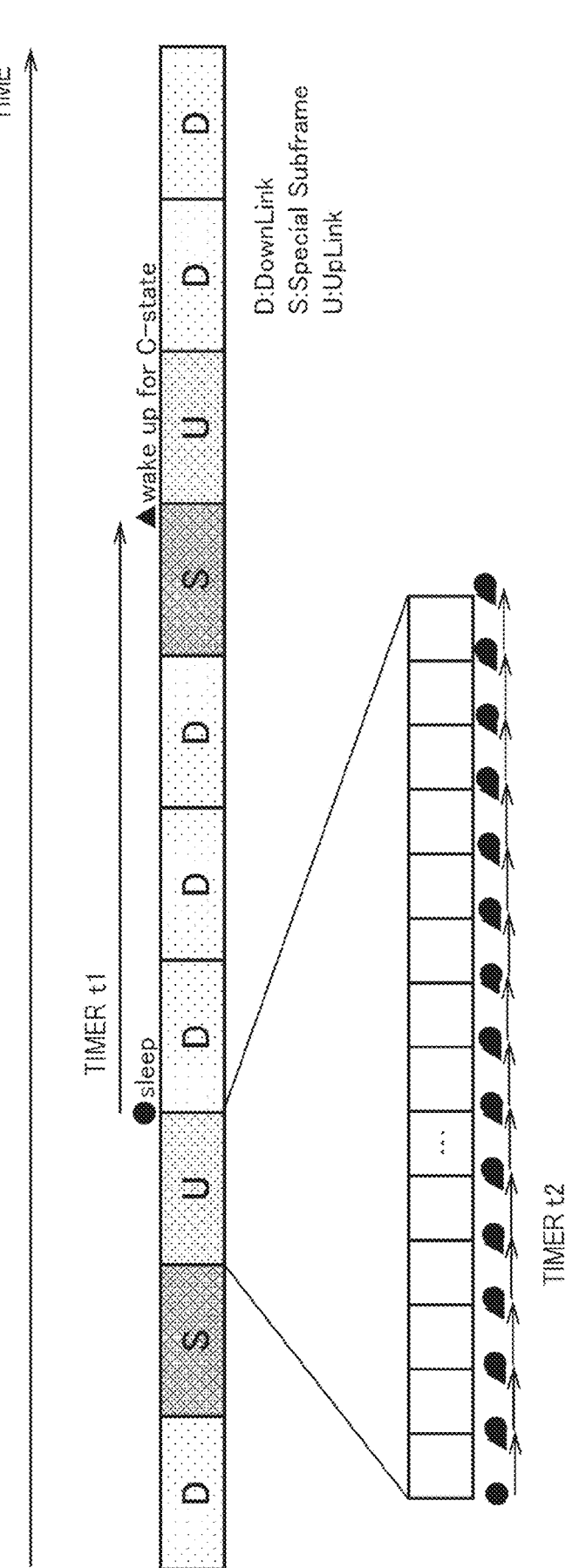
FIG. 14 is a diagram describing an example of time allocation of downlink and uplink in TDD in the server delay control system according to the second embodiment of the present invention.

FIG. 14 is a diagram describing an example of time allocation of downlink and uplink in time division duplex (TDD). FIG. 14 is an example of a case in which uplink subframe is allocated to Subframes 2 and 7 and (see Non Patent Literature 2).

In FIG. 14, D: downlink, S: special subframe, and U: uplink are written. In addition, mark ● indicates sleep, and mark ▲ indicates wake up for C-state.

Although it varies depending on type of the multiplexing of the RAN, in the case of time division duplex, time slots used for downlink and uplink are fixedly allocated. Therefore, because uplink data does not arrive except for a subframe allocated to uplink, the time of timer t1 can be set and sleep can be performed in this period. For the period of the subframe allocated to uplink, the time of timer t2 can be set and thereby sleep can be performed.

Timer t1

In the time allocation in the upper diagram of FIG. 14, the time from sleep at mark ● to wake up for C-state at mark ▲ is the time elapsed in timer t1.

Timer t1=4×t_sub−t_recover

Example: When t_sub=1 ms, t_recover=30 us, t1=about 3.97 ms,
where
subframe interval=t_sub
time assumed for recovery from C-state=t_recover
symbol interval=t_symbol (there is a specific value in the table of numerology in FIG. 15).

FIG. 15 is a diagram illustrating a table of subcarrier intervals and symbol intervals for each numerology. For example, in Numerology 0, a subcarrier interval is 15 kHz and 1 symbol interval is 71.4 μsec. Hereinafter, as indicated in Numerology 1, 2, 3, . . . , 1 symbol interval [μsec] is in a relationship of being halved as the subcarrier interval [kHz] is doubled.

Timer t2

Timer t2=t_symbol−t_recover

When Numerology=1 and t_recover=5 us, t2=about 30 us.

Arrival Timing of vRAN Traffic

The vRAN that is a target use case of Method <2> manages radio resources in frequency domain and time domain, and a frame arrives at a time interval of symbol that is the minimum unit in the time. Therefore, according to the symbol interval, it is assumed that the polling thread is woken up in advance to recover from the C-state.

However, because the presence/absence of arrival of a frame changes depending on the presence/absence of attribute of a terminal, the frames do not necessarily arrive at the symbol intervals. Therefore, waking up for each symbol interval includes the meaning of speculatively waking up, but because the number of CPU cycles associated with waking up is small, speculative waking up does not greatly contribute to an increase in power consumption.

Description is given below of operation of the server delay control system 1000A configured as described above.

The overall operation of the server delay control system 1000A is similar to that of the server delay control system 1000 of FIG. 1. In addition, <NIC and HW interrupt processing> is similar to that in FIG. 11, and thus description thereof is omitted.

Operation Flow of Polling Thread

Figure 16:
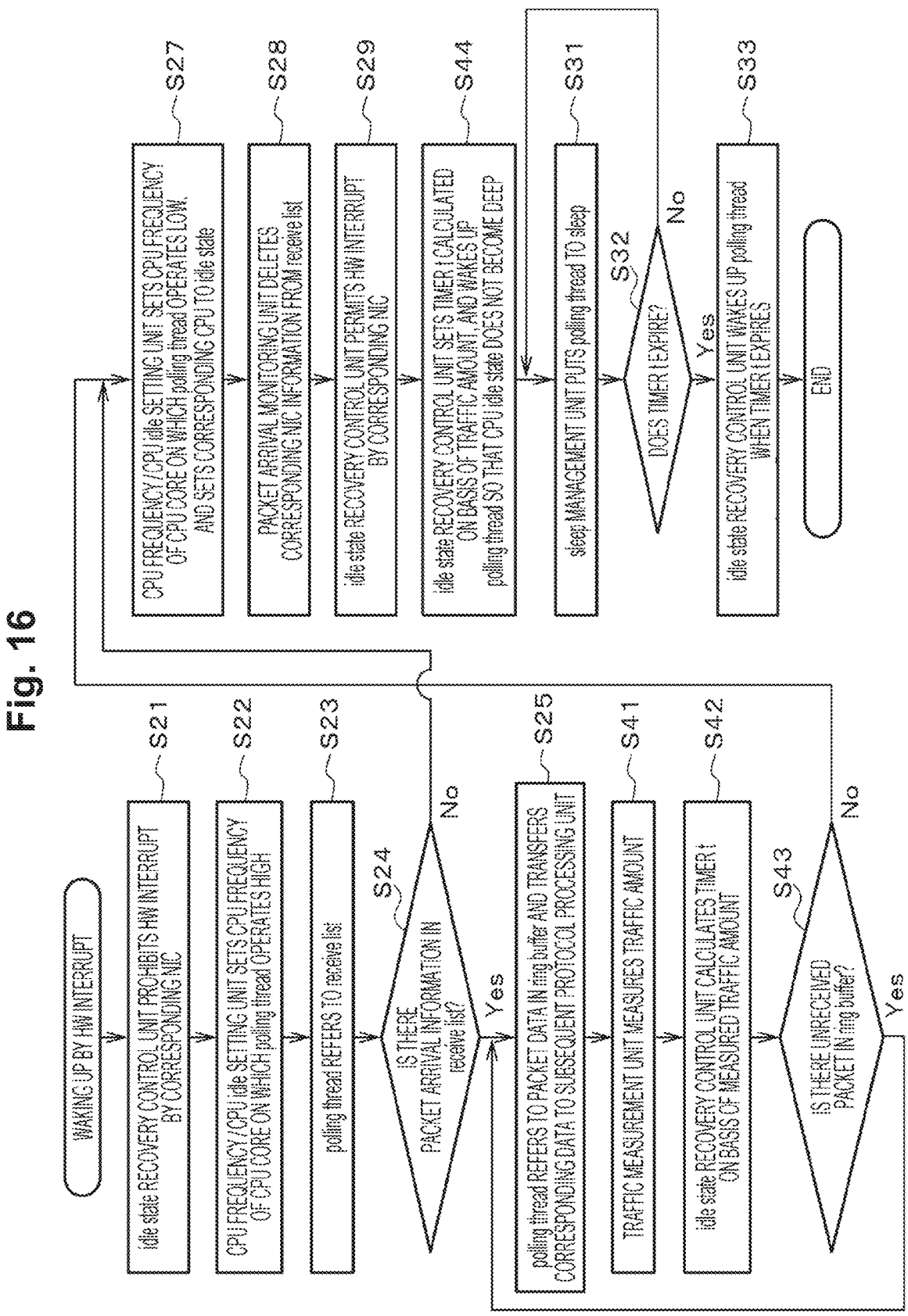
FIG. 16 is a flowchart indicating a processing of an operation mode of a wakeup logic in consideration of CPU idle of the server delay controller of the server delay control system according to the second embodiment of the present invention.

FIG. 16 is a flowchart indicating processing of an operation mode of a wakeup logic in consideration of CPU idle of the polling thread (server delay controller). Steps in which the same processing as those in the operation flow of FIG. 12 are performed are denoted by the same reference signs, and description of duplicate portions is omitted.

When the polling thread is in a sleep state, a packet arrives, the polling thread is awoken by a HW interrupt (HW interrupt of point 1), and the present flow of FIG. 16 starts.

In step S25, the polling thread refers to packet data in the ring buffer 72 and transfers the corresponding data to the subsequent protocol processing unit 74 and proceeds to step S41.

In step S41, the traffic measurement unit 220 (FIG. 13) of the packet arrival monitoring unit 210 measures the traffic amount.

In step S42, the idle state recovery control unit 150 (FIG. 13) calculates the timer t on the basis of the measured traffic amount.

In step S43, the packet harvesting unit 120 determines whether there is an unreceived packet in the ring buffer 72. When there is an unreceived packet in the ring buffer 72 (S43: Yes), the processing returns to step S25 described above.

In step S29, the idle state recovery control unit 150 permits a HW interrupt by the NIC and proceeds to step S44.

In step S44, the idle state recovery control unit 150 sets the timer t calculated on the basis of the traffic amount, and wakes up the polling thread so that the CPU idle state does not become deep.

As described above, the above-described t is set so that wakeup can be performed immediately before the timing of arrival of a next packet according to the traffic condition of services to which the present invention is applied and the time required for recovery to each idle state. In addition, in a case in which the packet arrival is irregular, the timing of packet arrival may be learned, and t may be determined using the learning result.

In step S33, the idle state recovery control unit 150 wakes up the polling thread when the timer t expires, and ends the processing of the present flow.

When the timer t expires, the polling thread wakes up (only by waking up, the C-state recovers to C0 or the like). When the C-state does not transition to C0 or the like only by waking up the polling thread, light calculation may be performed here to apply a load to the CPU. In addition, a CPU load is applied by executing the flow generated by the HW interrupt. Therefore, a flow similar to that in the case of being generated by the HW interrupt of the point 1 (the start point of the flow of FIG. 16) may be executed.

In addition, in a case in which the probability that packets arrive periodically is high, the probability that packets arrive after the timer t expires is also high. Therefore, the delay time may be suppressed by transitioning to the HW interrupt of point 1" and preparing for packet reception.

Instead of waking up the polling thread, the idle state of the CPU may be transitioned step by step to a lower number state. For example, the transition in stages may be made in a manner of not only C6 to C0 but also C6 to C3 and the like.

In this way, even in a case in which the packet arrival accuracy is low, it is possible to recover from a shallow idle state instead of recovery from a deep idle state, and even in a case in which a packet does not arrive, the state of certain idle state is obtained, and thus, it is possible to ensure power saving.

In addition, wakeup by the timer t may be performed by using a mechanism such as timerfd (registered trademark) in which a notification is received from kernel when a timer time elapses.

Hardware Configuration

Figure 17:
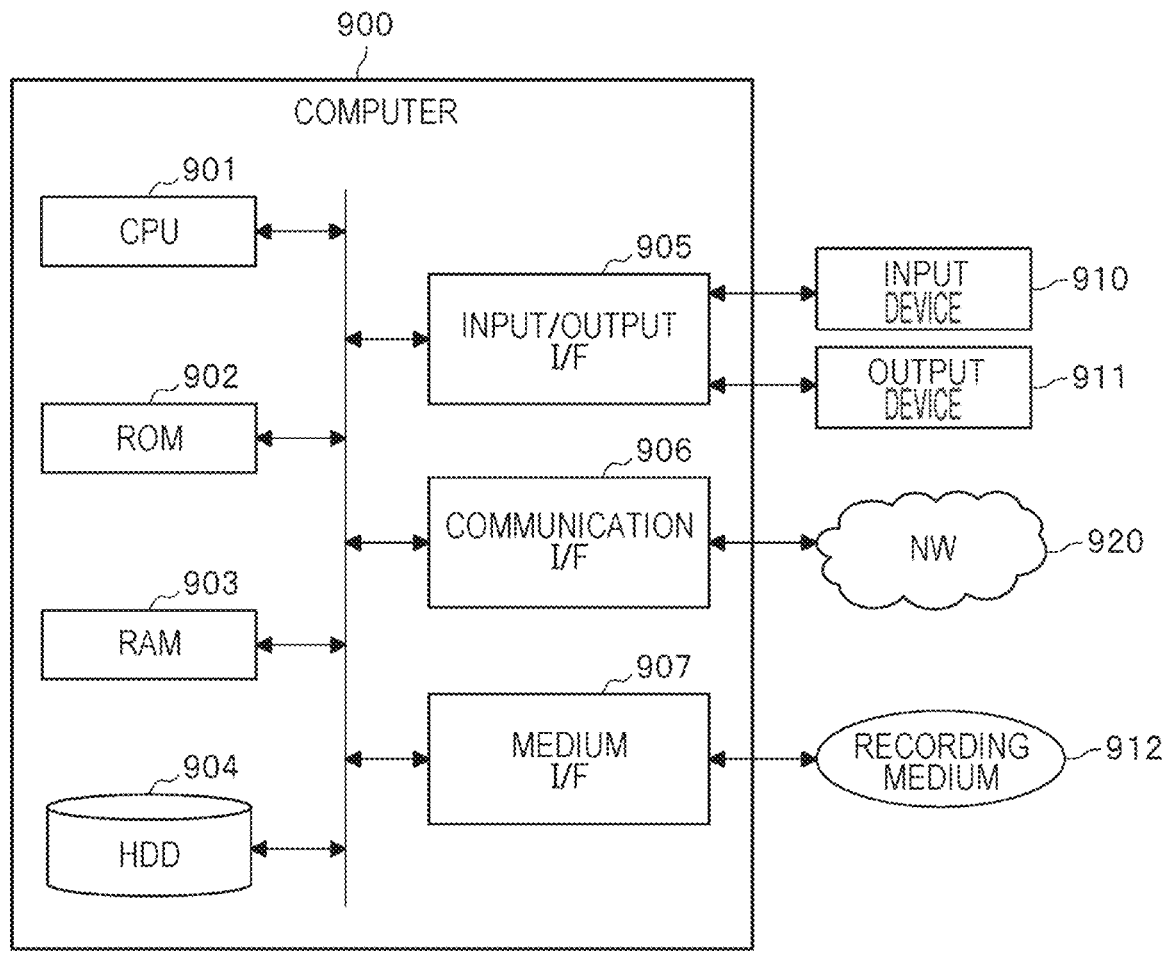
FIG. 17 is a hardware configuration diagram illustrating an example of a computer that implements the functions of the server delay controller of the server delay control system according to the embodiment of the present invention.

The server delay controllers 100 and 200 according to the first and second embodiments described above are achieved by a computer 900 having a configuration as illustrated in FIG. 17, for example.

FIG. 17 is a hardware configuration diagram illustrating an example of the computer 900 that implements the functions of the server delay controllers 100 and 200. The computer 900 includes a CPU 901, ROM 902, RAM 903, an HDD 904, a communication interface (I/F) 906, an input/output interface (I/F) 905, and a medium interface (I/F) 907.

The CPU 901 operates on the basis of a program stored in the ROM 902 or the HDD 904, and controls each unit of the server delay controllers 100 and 200 illustrated in FIGS. 1 to 3 and 13. The ROM 902 stores a boot program to be executed by the CPU 901 when the computer 900 starts, a program depending on hardware of the computer 900, and the like.

The CPU 901 controls an input device 910, such as a mouse or a keyboard, and an output device 911, such as a display, via the input/output I/F 905. The CPU 901 acquires data from the input device 910 and outputs generated data to the output device 911 via the input/output I/F 905. Note that a graphics processing unit (GPU) or the like may be used as a processor in conjunction with the CPU 901.

The HDD 904 stores a program to be executed by the CPU 901, data to be used by the program, and the like. The communication I/F 906 receives data from another device via a communication network (for example, network (NW) 920), outputs the data to the CPU 901, and transmits data generated by the CPU 901 to another device via the communication network.

The medium I/F 907 reads a program or data stored in a recording medium 912, and outputs the program or data to the CPU 901 via the RAM 903. The CPU 901 loads a program related to objective processing from the recording medium 912 into the RAM 903 via the medium I/F 907 and executes the loaded program. The recording medium 912 is an optical recording medium such as a digital versatile disc (DVD) or a phase change rewritable disk (PD), a magneto-optical recording medium such as a magneto optical disk (MO), a magnetic recording medium, a conductor memory tape medium, a semiconductor memory, or the like.

For example, in a case in which the computer 900 functions as the server delay controllers 100 and 200 configured as a device according to the present embodiment, the CPU 901 of the computer 900 implements the functions of the server delay controllers 100 and 200 by executing a program loaded into the RAM 903. In addition, the HDD 904 stores data in the RAM 903. The CPU 901 reads the program related to the objective processing from the recording medium 912, and executes the program. Additionally, the CPU 901 may read the program related to the objective processing from another device via the communication network (NW 920).

Application Example

Mode in Which Polling Thread is Arranged in Kernel

As in the case of the polling thread (server delay controller 100) illustrated in FIG. 2, the invention is applicable to a server delay controller that starts a thread that monitors packet arrival in a polling model in a kernel. In this case, the OS is not limited to a specific OS. In addition, the environment is not limited to a server virtualized environment. Therefore, the server delay control system can be applied to the configurations illustrated in FIGS. 18 and 19.

Example of Application to VM Configuration

Figure 18:
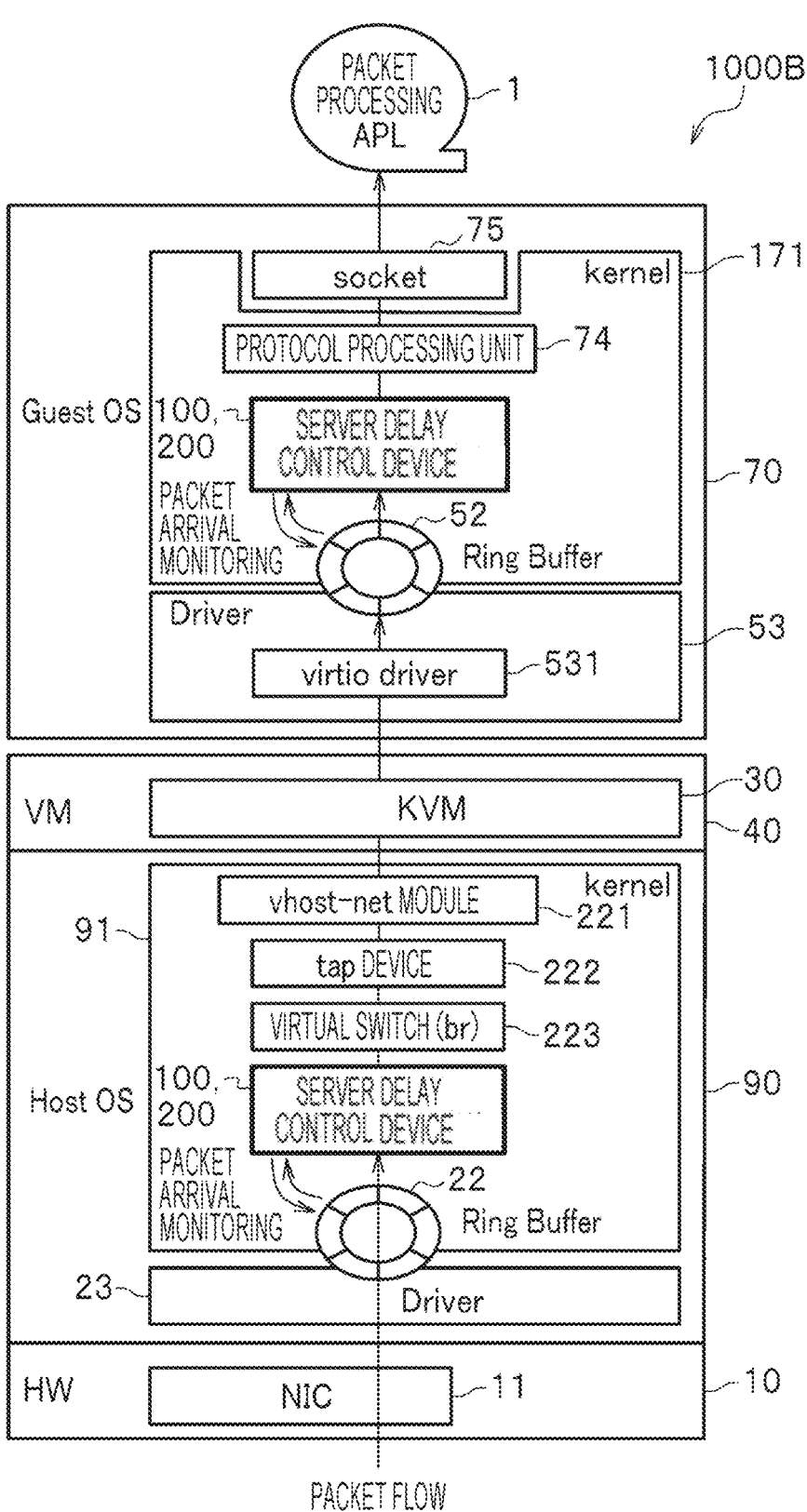

FIG. 18 is a diagram illustrating an example in which a server delay control system 1000B is applied to an interrupt model in a server virtualized environment of a general-purpose Linux kernel (registered trademark) and a VM configuration. The same components as those in FIGS. 1, 13, and 22 are denoted by the same reference signs.

As illustrated in FIG. 18, in the server delay control system 1000B, the server delay controllers 100 and 200 are arranged in a kernel 171 of a guest OS 70, and the server delay controllers 100 and 200 are arranged in a kernel 91 of a host OS 90.

Specifically, the server includes the host OS 90 in which a virtual machine and an external process formed outside the virtual machine can operate, and the guest OS 70 that operates in a virtual machine.

The host OS 90 includes: the kernel 91, a ring buffer 22 that is managed by the kernel 91 in a memory space in the server including the host OS 90, the receive list 186 (FIG. 2) that registers net device information indicating which device a hardware interrupt (hardIRQ) from the NIC 11 comes from, a vhost-net module 221 that is a kernel thread, a tap device 222 that is a virtual interface created by the kernel 91, and a virtual switch (br) 223.

The kernel 91 includes the server delay control devices 100 and 200.

The kernel 91 includes the server delay controllers 100 and 200. The kernel 91 transmits a packet to a virtual machine 30 via the tap device 222.

Meanwhile, the guest OS 70 includes: the kernel 171, a ring buffer 52 that is managed by the kernel 171 in a memory space in the server including the guest OS 70, the receive list 186 (FIG. 2) that registers net_device information indicating which device a hardware interrupt (hardIRQ) from the NIC 11 comes from, and a socket 75 that is an interface for the kernel 171 to perform interprocess communication.

The kernel 171 includes the server delay controllers 100 and 200, and the protocol processing unit 74 that performs protocol processing of a packet on which harvesting has been executed.

Thus, in the system having a virtual server configuration of a VM, packet transfer can be performed with a shorter delay in the server without modification to the APL in both OSs: the host OS 90 and the guest OS 70.

<Example of Application to Container Configuration>

FIG. 19 is a diagram illustrating an example in which a server delay control system 1000C is applied to an interrupt model in a server virtualized environment of a container configuration. The same components as those in FIGS. 1 and 18 are denoted by the same reference signs.

As illustrated in FIG. 19, the server delay control system 1000C includes a host OS 90, and a container configuration in which the OS is replaced with a container 211. The container 211 includes a virtual NIC (vNIC) 212.

In a system having a virtual server configuration such as a container, packet transfer can be performed with a shorter delay in the server without modification to the APL.

The mode in which the polling thread is arranged in the kernel has been described above. Next, a mode in which a polling thread is arranged in a user space is described.

Mode in Which Polling Thread is Arranged in User Space

As illustrated in FIG. 3, the invention is applicable to a configuration example in which the polling thread (server delay controller 100) is arranged in a user space. In this case, the OS is not limited. In addition, the environment is not limited to a server virtualized environment. Therefore, the server delay control system can be applied to the configurations illustrated in FIGS. 20 and 21.

Example of Application to VM Configuration

FIG. 20 is a diagram illustrating an example in which a server delay control system 1000D is applied to an interrupt model in a server virtualized environment of a general-purpose Linux kernel (registered trademark) and a VM configuration. The same components as those in FIGS. 1, 13, and 18 are denoted by the same reference signs.

As illustrated in FIG. 20, the server delay control system 1000D includes a host OS 20 in which a virtual machine and an external process formed outside the virtual machine can operate, and the host OS 20 includes a kernel 21 and a driver 23. The server delay control system 1000D further includes a NIC 11 of HW connected to the host OS 20, a polling thread (server delay controllers 100 and 200) arranged in a user space 60, a virtual switch 53, a guest OS 1 (50) operating in a virtual machine, and a polling thread (server delay controllers 100 and 200) arranged in the user space 60 connected to the host OS 20.

Thus, in the system having a virtual server configuration of a VM, packet transfer can be performed with a shorter delay in the server without modification to the APL in both OSs: the host OS 20 and the guest OS 1 (50).

Example of Application to Container Configuration

FIG. 21 is a diagram illustrating an example in which a server delay control system 1000E is applied to an interrupt model in a server virtualized environment of a container configuration. The same components as those in FIGS. 1, 13, and 20 are denoted by the same reference signs.

As illustrated in FIG. 21, the server delay control system 1000E has a container configuration in which the guest OS 50 of FIG. 20 is replaced with a container 211. The container 211 includes a virtual NIC (vNIC) 212.

In a system having a virtual server configuration such as a container, packet transfer can be performed with a shorter delay in the server without modification to the APL.

Example of Application to Bare Metal Configuration (Non-Virtualized Configuration The present invention can be applied to a system having a non-virtualized configuration such as a bare metal configuration. In a system having a non-virtualized configuration, packet transfer can be performed with a shorter delay in the server without modification to the APL.

Scale in/out

In a case in which the traffic amount is large and a plurality of NIC devices and NIC ports are used, it is possible to scale in/out the polling thread while performing HW interrupt frequency control by operating a plurality of polling threads in association with the NIC devices and the NIC ports.

Extended Technology

In a case in which the number of traffic flows increases, the present invention cooperates with receive-side scaling (RSS) capable of processing an inbound network traffic with a plurality of CPUs, to increase the number of CPUs to be assigned to the packet arrival monitoring thread. Thus, scaling out with respect to the network load becomes possible.

Application to PCI Device I/O Such as Accelerator

Although a network interface card (NIC) I/O has been exemplified, the present technology is also applicable to I/O of a PCI device such as an accelerator (FPGA/GPU or the like). In particular, it can be used for, for example, polling at the time of receiving a response of an offload result to an accelerator of forward error correction (FEC) in the vRAN.

Application to Processor Other Than CPU

The present invention is similarly applicable to a case in which a processor such as GPU/FPGA/application specific integrated circuit (ASIC) has an idle state function in addition to the CPU.

Effects

As described above, the server delay controller 100 (see FIGS. 1 and 2) that is arranged in a kernel space of the OS and starts a thread that monitors packet arrival using a polling model includes: the packet arrival monitoring unit 110 that monitors (polling) a poll list (receive list 186) that registers net device information indicating which device a hardware interrupt (hardIRQ) from an interface unit (NIC 11) comes from, the packet harvesting unit 120 that refers to a packet held in a ring buffer (ring buffer 72) when the packet arrives and executes harvesting to delete an entry of a corresponding queue from the ring buffer, the sleep management unit 130 that puts a thread (polling thread) to sleep when a packet does not arrive for a predetermined period, and cancels the sleep of the thread (polling thread) with a hardware interrupt (hardIRQ) at the time of packet arrival, and an idle state recovery control unit 150 that periodically wakes up the thread at the time of sleep or wakes up the thread immediately before the packet arrival in accordance with a packet arrival timing.

In this way, it is possible to perform packet transfer with a shorter delay in the server while curbing excessive occurrence of a HW interrupt due to sleep of a polling thread and reducing power consumption. In order to prevent the CPU from falling into a deep idle state due to the LPI (C-state) when the packet non-arrival time is extended, the server delay controller 100 can suppress an extension in the delay time associated with the recovery from the deep idle state by performing the periodic wakeup/the pre-wakeup in accordance with the packet arrival timing (low delay 1).

In addition, because the packet arrival monitoring and reception processing are performed by the polling model, softIRQ contention does not occur, and the delay can be reduced. In addition, when a packet arrives at the time of sleep, because the polling thread is awoken by a hardIRQ with high priority, the overhead due to sleep can be suppressed as much as possible (low delay 2).

In addition, while a packet does not arrive, the polling thread sleeps and the control is performed to set the CPU frequency low, so that an increase in power consumption due to busy polling can be suppressed (power saving).

As described above, in the server packet transfer method/system for delivering a packet arriving at the NIC to an application, it is possible to simultaneously achieve power saving while achieving low delay. In particular, by putting the polling thread to sleep when the packet non-arrival time becomes long, it is possible to avoid the problem that the delay time becomes long at the time of recovery due to the CPU core falling into a deep idle state by performing the periodic wakeup/wakeup in consideration of the packet arrival timing. Accordingly, the low delay can be ensured.

In addition, the present invention can be applied to a case in which there is a polling thread inside the kernel, such as NAPI or KBP.

In addition, the server delay controller 100 (see FIGS. 1 and 3) that is arranged in a user space and starts a thread that monitors packet arrival using a polling model includes: the packet arrival monitoring unit 110 that monitors (polling) packet arrival from an interface unit (NIC 11), the packet harvesting unit 120 that refers to a packet held in a ring buffer (ring buffer 72) when the packet arrives and executes harvesting to delete an entry of a corresponding queue from the ring buffer, the sleep management unit 130 that puts a thread (polling thread) to sleep when a packet does not arrive for a predetermined period, and cancels the sleep of the thread (polling thread) with a hardware interrupt (hardIRQ) at the time of packet arrival, and the idle state recovery control unit 150 that periodically wakes up the thread at the time of sleep or wakes up the thread immediately before the packet arrival in accordance with a packet arrival timing.

In this way, it is possible to perform packet transfer with a shorter delay in the server while curbing excessive occurrence of a HW interrupt due to sleep of a polling thread and reducing power consumption. The server delay controller 100 (see FIGS. 1 and 3) can suppress an extension in the delay time associated with the recovery from a deep idle state in a case in which there is a polling thread in a user space as in the DPDK and ensure low delay.

In addition, a guest OS (guest OS 70) (see FIG. 18) (guest OS 180) (see FIG. 19) that operates in a virtual machine includes: a kernel (kernel 171), a ring buffer (ring buffer 72) (see FIG. 18) that is managed by the kernel in a memory space in the server including the guest OS, the packet arrival monitoring unit 110 that monitors packet arrival from an interface unit (NIC 11), the packet harvesting unit 120 that refers to a packet held in the ring buffer when the packet arrives and executes harvesting to delete an entry of a corresponding queue from the ring buffer, the protocol processing unit that performs protocol processing on a packet on which harvesting has been executed, and the server delay controllers 100 and 200 that start a thread that monitors packet arrival using a polling model in the kernel, in which the server delay controllers 100 and 200 include: the sleep management unit 130 that puts the thread (polling thread) to sleep when a packet does not arrive for a predetermined period, and cancels the sleep of the thread (polling thread) with a hardware interrupt (hardIRQ) at the time of packet arrival, and the idle state recovery control unit 150 that periodically wakes up the thread at the time of sleep or wakes up the thread immediately before the packet arrival in accordance with a packet arrival timing.

In this manner, in a system having a virtual server configuration of a VM, for the server including a guest OS (the guest OS 70), it is possible to suppress an extension in the delay time due to the recovery from a deep idle state, and it is possible to ensure low delay.

In addition, a host OS (the host OS 90) (see FIG. 18) (host OS 20) (see FIGS. 20 and 21) in which a virtual machine and an external process formed outside the virtual machine can operate includes: a kernel (kernel 91), a ring buffer (ring buffer 72) (see FIG. 22) that is managed by the kernel in a memory space in the server including the host OS, the packet arrival monitoring unit 110 that monitors packet arrival from an interface unit (NIC 11), the packet harvesting unit 120 that refers to a packet held in the ring buffer when the packet arrives and executes harvesting to delete an entry of a corresponding queue from the ring buffer, the tap device 222 (see FIG. 18) that is a virtual interface created by the kernel (kernel 21), and the server delay controllers 100 and 200 that start a thread that monitors packet arrival using a polling model in the kernel, in which the server delay controllers 100 and 200 include: the packet arrival monitoring unit 110 that monitors (polling) the poll list, the packet harvesting unit 120 that refers to a packet held in a ring buffer (ring buffer 72) (see FIG. 22) when the packet arrives and executes harvesting to delete an entry of a corresponding queue from the ring buffer (ring buffer 72), the sleep management unit 130 that puts the thread (polling thread) to sleep when a packet does not arrive for a predetermined period, and cancels the sleep of the thread (polling thread) with a hardware interrupt (hardIRQ) at the time of packet arrival, and the idle state recovery control unit 150 that periodically wakes up the thread at the time of sleep or wakes up the thread immediately before the packet arrival in accordance with a packet arrival timing.

In this manner, in a system having a virtual server configuration of a VM, for the server including a kernel (kernel 171) and a host OS (host OS 90), it is possible to suppress an extension in the delay time due to the recovery from a deep idle state without modification to the APL while reducing power consumption, and it is possible to ensure low delay.

In the server delay controller 200 (see FIG. 13), the idle state recovery control unit 150 includes the management unit 160 that selects either periodic wakeup control for periodically waking up the thread at the time of sleep or pre-wakeup control for waking up the thread immediately before the packet arrival in accordance with the packet arrival timing.

In this way, when the packet arrival timing cannot be predicted, the management unit 160 can select the periodic wakeup control for periodically waking up the polling thread, and when the packet arrival timing can be predicted as in RAN, the management unit 160 can select the pre-wakeup control for waking up the polling thread in advance using the timer, and the application range or implementation can be expanded. In the first and second embodiments, because the conventional method can also be selected, it can be widely applied to existing systems without modification. Here, the periodic wakeup can be applied to a case in which the packet arrival timing cannot be predicted, and the pre-wakeup can keep the LPI (C-state) as deep as possible as long as possible, so that the sleep control can be effectively performed, and both the low delay and the power saving can be further achieved.

Note that, in each of the above embodiments, a case in which there is a polling thread inside the kernel as in NAPI or KBP has been described, but a mode (see FIGS. 3 and 21) in which the polling thread is arranged in a user space as in DPDK may be adopted.

Note that, among the pieces of processing described in each of the above embodiments, all or some of the processing described as those to be automatically performed may be manually performed, or all or some of the processing described as those to be manually performed may be automatically performed by a known method. In addition to this, information including the processing procedures, the control procedures, the specific names, the various kinds of data, and the parameters mentioned above in the specification or shown in the drawings can be modified as desired, unless otherwise particularly specified.

In addition, each of the components of each of the devices illustrated in the drawings is functionally conceptual, and is not required to be physically designed as illustrated. In other words, a specific mode of distribution and integration of individual devices is not limited to the illustrated mode, and all or part of the configuration can be functionally or physically distributed and integrated in any unit according to various loads, usage conditions, and the like.

In addition, some or all of the component, functions, processing units, processing means, and the like described above may be implemented by hardware, for example, by designing them in an integrated circuit. In addition, the respective components, functions, and the like may be implemented by software for interpreting and executing a program for causing a processor to implement the functions. Information such as a program, a table, and a file for implementing the functions can be held in a recording device such as a memory, a hard disk, or a solid state drive (SSD), or in a recording medium such as an integrated circuit (IC) card, a secure digital (SD) card, or an optical disc.

REFERENCE SIGNS LIST

1 Packet processing application (APL)
10 HW
11 NIC (physical NIC, interface unit)
20, 90 Host OS (OS)
22, 72 Ring buffer
51, 70 Guest OS (OS)
60 User space
70 Guest OS
74 Protocol processing unit
86,186 Receive list (poll list)
90 Host OS
91,171 Kernel
100, 200 Server delay control devicecontroller (polling thread)
110, 210 Packet arrival monitoring unit
120 Packet harvesting unit
130 Sleep management unit
140 CPU frequency/CPU idle setting unit
150 Idle state recovery control unit
160 Management unit

220 Traffic measurement unit
211 Container
1000, 1000A, 1000B, 1000C, 1000D, 1000E Server delay control system

The invention claimed is:

1. A non-transitory computer-readable storage medium storing instructions that upon execution, cause a computer to operate as a server delay controller that is arranged in a kernel space of an operating system (OS) and starts a thread that monitors packet arrival using a polling model, wherein execution of the instructions causes the computer operating as the server delay controller to perform operations comprising:

monitoring a poll list that registers net device information indicating which device a hardware interrupt from an interface unit comes from;

referring to a packet held in a ring buffer when a packet arrives executing harvesting to delete an entry of a corresponding queue from the ring buffer;

putting the thread to sleep in a case in which a packet does not arrive for a predetermined period, and cancelling the sleep of the thread through a hardware interrupt at a time of packet arrival, and periodically waking up the thread during sleep or wakes up the thread immediately before the packet arrival in accordance with a packet arrival timing.

2. A non-transitory computer-readable storage medium storing instructions that upon execution, cause a computer to operate as a server delay controller that is arranged in a user space and starts a thread that monitors packet arrival using a polling model, wherein execution of the instructions causes the computer operating as the server delay controller to perform operations comprising:

monitoring packet arrival from an interface unit;

referring to a packet held in a ring buffer when a packet arrives and executing harvesting to delete an entry of a corresponding queue from the ring buffer;

putting the thread to sleep in a case in which a packet does not arrive for a predetermined period, and cancelling the sleep of the thread through a hardware interrupt at a time of packet arrival; and periodically waking up the thread during sleep or waking up the thread immediately before the packet arrival in accordance with a packet arrival timing.

3. A non-transitory computer-readable storage medium storing instructions that upon execution, cause a computer to operate as a server delay controller wherein a guest operating system (OS) that operates in a virtual machine includes:

a kernel, a ring buffer that is managed by the kernel in a memory space in a server including the guest OS, a packet arrival monitoring unit that monitors packet arrival from an interface unit, a packet harvesting unit that refers to a packet held in the ring buffer when a packet arrives and executes harvesting to delete an entry of a corresponding queue from the ring buffer, a protocol processing unit that performs protocol processing on a packet on which harvesting has been executed, and the server delay controller that starts a thread that monitors packet arrival using a polling model in the kernel, and the server delay controller includes:

a sleep management unit that puts the thread to sleep in a case in which a packet does not arrive for a predetermined period, and cancels the sleep of the thread through a hardware interrupt at a time of packet arrival, and an idle state recovery control unit that periodically wakes up the thread during sleep or wakes up the thread immediately before the packet arrival in accordance with a packet arrival timing.

4. A non-transitory computer-readable storage medium storing instructions that upon execution, cause a computer to operate as a server delay controller wherein a host OS in which a virtual machine and an external process formed outside the virtual machine can operate includes:

a kernel, a ring buffer that is managed by the kernel in a memory space in a server including the host OS, a packet arrival monitoring unit that monitors packet arrival from an interface unit, a packet harvesting unit that refers to a packet held in the ring buffer when a packet arrives and executes harvesting to delete an entry of a corresponding queue from the ring buffer, a tap that is a virtual interface created by the kernel, and the server delay controller that starts a thread that monitors packet arrival using a polling model in the kernel, and the server delay controller includes a packet arrival monitoring unit that monitors a poll list that registers net device information indicating which device a hardware interrupt from the interface unit comes from, a packet harvesting unit that refers to a packet held in a ring buffer when a packet arrives and executes harvesting to delete an entry of a corresponding queue from the ring buffer, a sleep management unit that puts the thread to sleep in a case in which a packet does not arrive for a predetermined period, and cancels the sleep of the thread through a hardware interrupt at a time of packet arrival, and an idle state recovery control unit that periodically wakes up the thread at a time of sleep or wakes up the thread immediately before the packet arrival in accordance with a packet arrival timing.

5. The non-transitory computer-readable storage medium according to claim 1, wherein the periodically waking up the thread includes selecting either periodic wakeup control for periodically waking up the thread during sleep or pre-wakeup control for waking up the thread immediately before the packet arrival in accordance with the packet arrival timing.

6. A server delay control method of a server delay controller that is arranged in a kernel space of an OS, implemented by a computer when the computer executes instructions, and starts a thread that monitors packet arrival using a polling model, the server delay controller executing:

monitoring a poll list that registers net device information indicating which device a hardware interrupt from an interface unit comes from;

referring to a packet held in a ring buffer when a packet arrives and executing harvesting to delete an entry of a corresponding queue from the ring buffer;

putting the thread to sleep in a case in which a packet does not arrive for a predetermined period, and canceling the sleep of the thread with a hardware interrupt at a time of packet arrival, and periodically waking up the thread during sleep or waking up the thread immediately before the packet arrival in accordance with a packet arrival timing.

7. A server delay control method of a server delay controller that is arranged in a user space, implemented by a computer when the computer executes instructions, and starts a thread that monitors packet arrival using a polling model, the server delay controller executing:

monitoring packet arrival from an interface unit;

referring to a packet held in a ring buffer when a packet arrives and executing harvesting to delete an entry of a corresponding queue from the ring buffer;

putting the thread to sleep in a case in which a packet does not arrive for a predetermined period, and canceling the sleep of the thread through a hardware interrupt at a time of packet arrival; and periodically waking up the thread at a time of sleep or waking up the thread immediately before the packet arrival in accordance with a packet arrival timing.

8. A device including the computer and the non-transitory computer-readable storage medium storing the instructions according to claim 1.

* * * * *